US009834076B2

(12) United States Patent
Rohr et al.

(10) Patent No.: US 9,834,076 B2
(45) Date of Patent: Dec. 5, 2017

(54) DUAL ACTION TRUCK BED COVER

(71) Applicant: A.R.E. Accessories, LLC, Ann Arbor, MI (US)

(72) Inventors: Andrew N. Rohr, Wadsworth, OH (US); Robert E. Hill, Jr., Massillon, OH (US)

(73) Assignee: A.R.E. Accessories, LLC, Ann Arbor, MI (US)

( * ) Notice: Subject to any disclaimer, the term of this patent is extended or adjusted under 35 U.S.C. 154(b) by 2 days.

(21) Appl. No.: 15/048,028

(22) Filed: Feb. 19, 2016

(65) Prior Publication Data

US 2016/0280123 A1 Sep. 29, 2016

Related U.S. Application Data

(60) Provisional application No. 62/137,907, filed on Mar. 25, 2015.

(51) Int. Cl.
*B60J 7/16* (2006.01)
*B60J 7/06* (2006.01)

(52) U.S. Cl.
CPC ............ *B60J 7/1621* (2013.01); *B60J 7/067* (2013.01); *B60J 7/068* (2013.01); *B60J 7/1607* (2013.01)

(58) Field of Classification Search
CPC ..... B60J 7/067; B60J 7/085; B60J 7/12; B60J 7/14; B60J 7/141; B60J 7/1607; B60J 7/1621; B60P 7/02
USPC ................... 296/98, 100.01, 100.03, 100.06
See application file for complete search history.

(56) References Cited

U.S. PATENT DOCUMENTS

| 3,765,717 | A | | 10/1973 | Garvert |
| 4,479,677 | A | | 10/1984 | Gulette et al. |
| 4,889,381 | A | | 12/1989 | Tamblyn et al. |
| 5,040,843 | A | | 8/1991 | Russell et al. |
| 5,330,246 | A | | 7/1994 | Bernardo |
| 5,988,728 | A | * | 11/1999 | Lund ...................... B60J 7/1621 296/100.03 |
| 6,170,723 | B1 | | 1/2001 | Howell |
| 6,588,826 | B1 | * | 7/2003 | Muirhead .............. B60J 7/1621 296/100.06 |
| 6,712,418 | B1 | | 3/2004 | Lathers |
| 6,848,734 | B1 | | 2/2005 | Mulvaney |
| 6,896,313 | B2 | | 5/2005 | Mack et al. |
| 7,946,643 | B2 | | 5/2011 | Getschel et al. |
| 8,087,713 | B2 | | 1/2012 | Schrader et al. |

(Continued)

*Primary Examiner* — Jason S Daniels
(74) *Attorney, Agent, or Firm* — Harness, Dickey & Pierce, P.L.C.

(57) ABSTRACT

A dual action truck cover provides two modes, actions or ways to access contents in a truck bed. Side rails can be mountable to a cargo box so as to be pivotable between a raised position to provide a rear opening in an open pivot arrangement, and a lowered or closed pivot arrangement. The side rails can be spaced apart to define an inter-rail area therebetween. A door can include a plurality of elements hingedly coupled together and extending between the side rails and movable between a closed door arrangement wherein the elements cover the inter-rail area, and an open door arrangement in which the elements are positioned to permit access through the inter-rail area. The door can move between the open and closed arrangements by rolling up the hingedly coupled elements together or folding the elements together.

17 Claims, 25 Drawing Sheets

(56) References Cited

U.S. PATENT DOCUMENTS

| | | | |
|---|---|---|---|
| 8,672,388 B2* | 3/2014 | Rusher | B60P 7/02 296/100.09 |
| 2001/0038225 A1 | 11/2001 | Muirhead | |
| 2003/0230909 A1 | 12/2003 | Melius et al. | |
| 2013/0229027 A1 | 9/2013 | Copp et al. | |

* cited by examiner

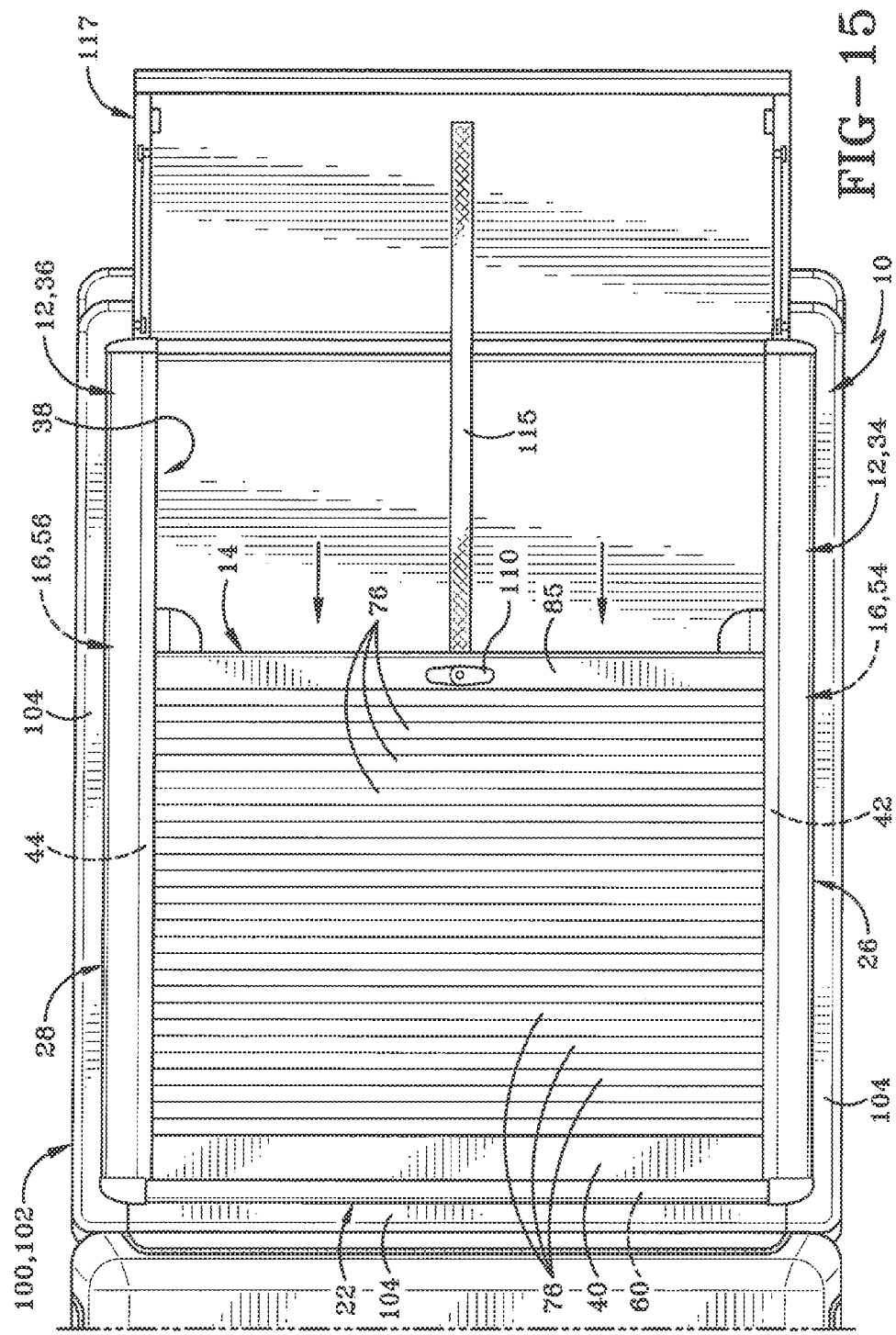

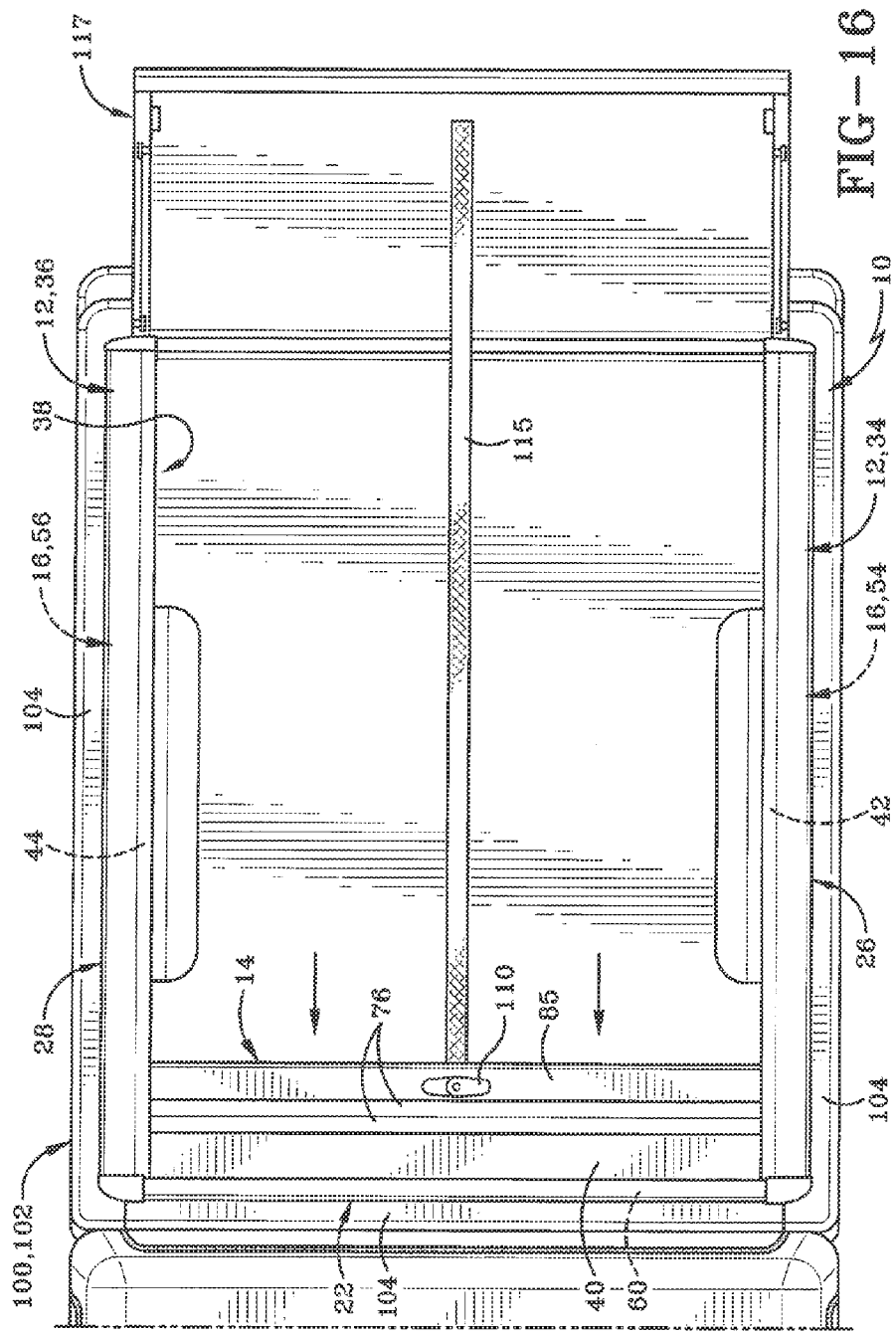

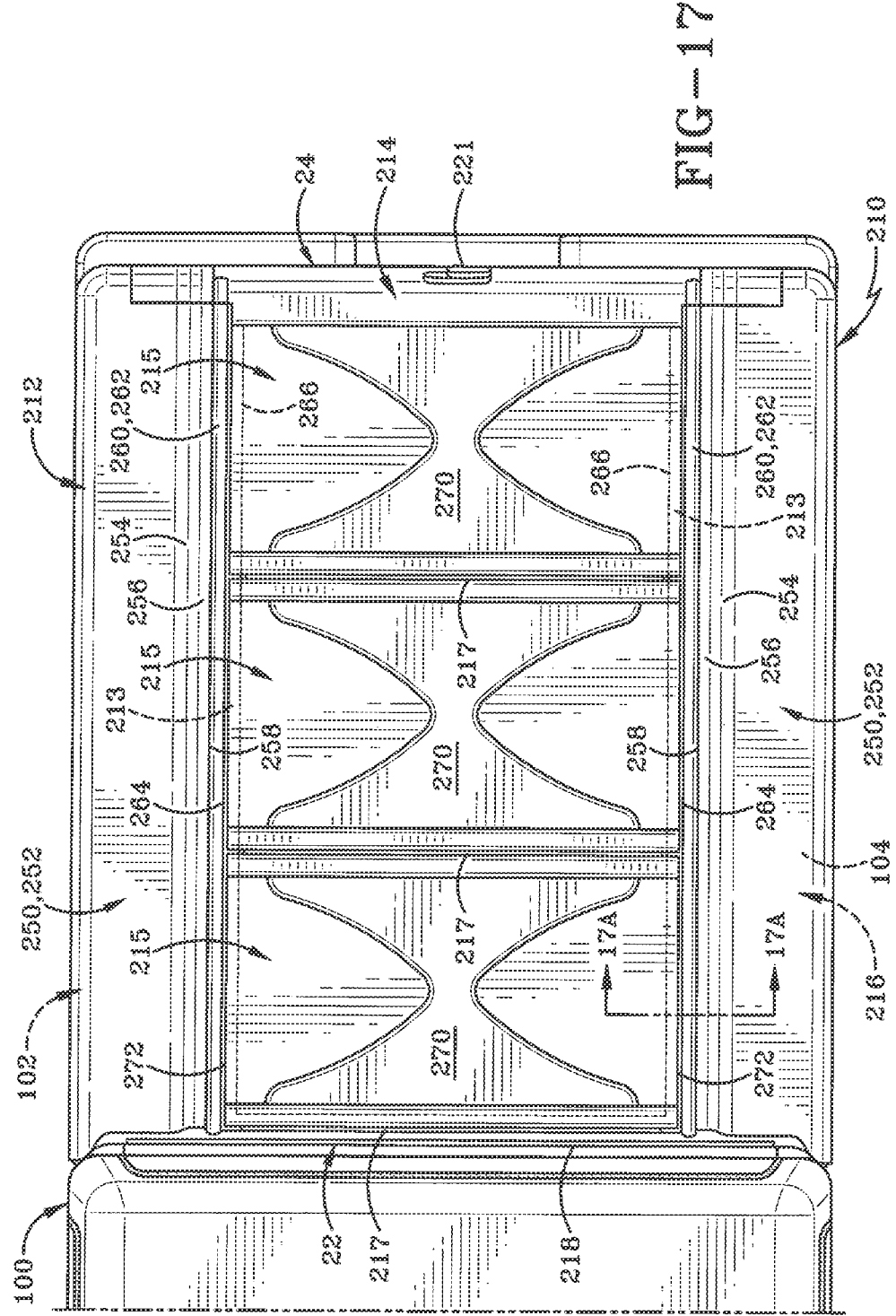

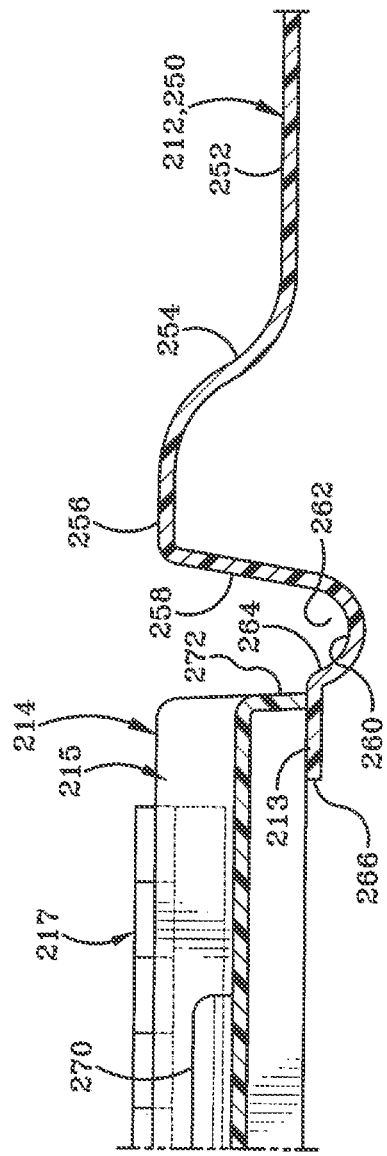

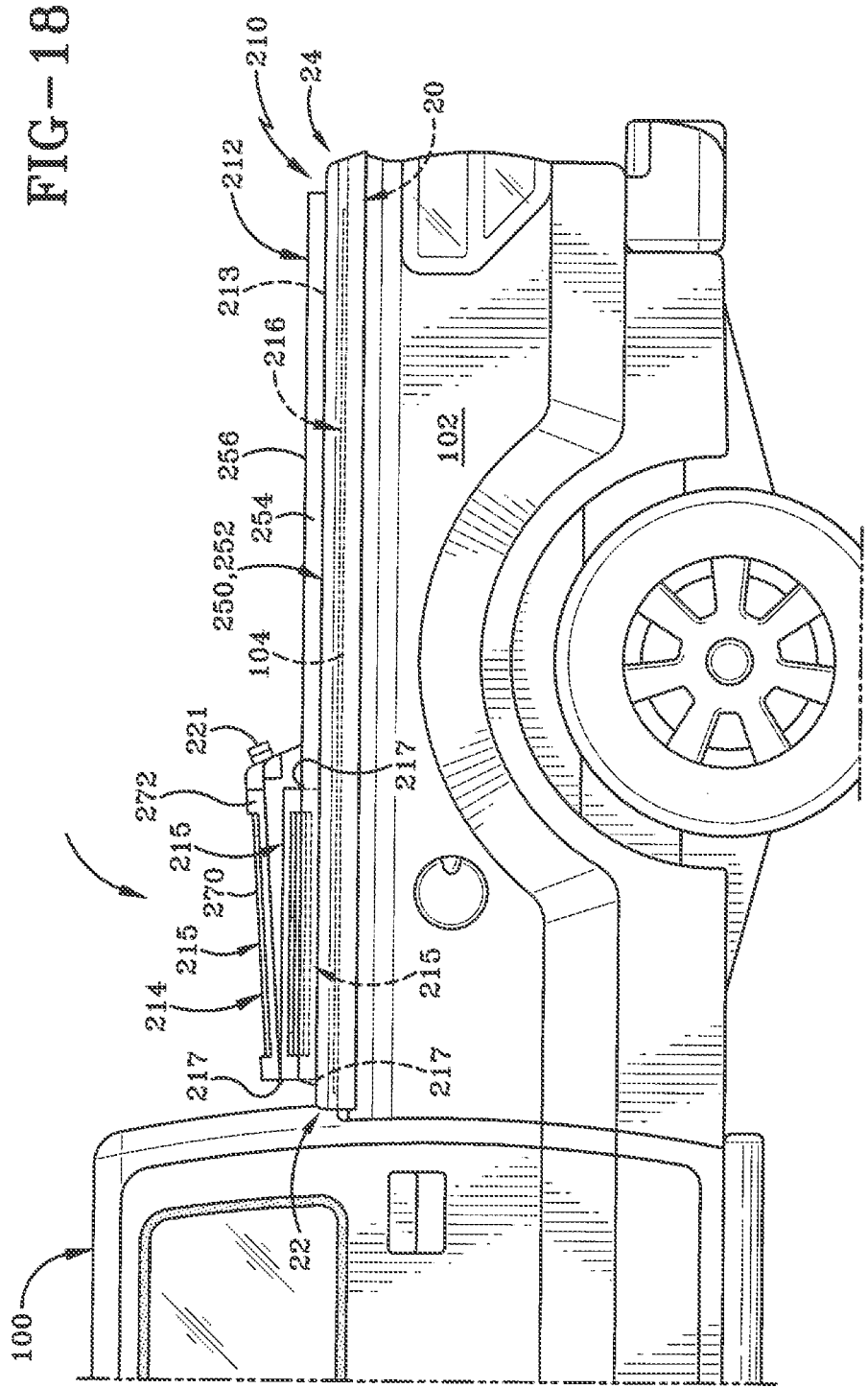

DUAL ACTION TRUCK BED COVER

CROSS-REFERENCE TO RELATED APPLICATIONS

This application claims the benefit of U.S. Provisional Application No. 62/137,907, filed on Mar. 25, 2015. The entire disclosure of the above application is incorporated herein by reference.

FIELD

The present disclosure relates generally to the field of pickup truck accessories. More particularly, the present disclosure relates to a cover for a truck bed on a pickup truck. Specifically, the present disclosure relates to a dual action cover mountable to a pickup truck.

BACKGROUND

Pickup trucks include an open truck bed mounted on a frame behind a passenger cabin. These types of trucks are known for their versatility and ability to haul items in the truck bed or tow implements from a hitch coupled to the frame. Furthermore, these pickup trucks are often useful to a wide range of operators, from commercial contractors hauling heavy equipment, to weekend users hauling grass clippings and mulch.

In some environments, it is beneficial to close the truck bed in order to protect contents stored therein. There are two main accessories someone can attach to their truck to protect the contents within the truck bed. The first way of protecting contents inside a truck bed is through the use of a camper shell (also known as a canopy, and sometimes topper, cap, bed cap, box cap, or simply shell) which is a small housing or rigid canopy. The camper shell housing is usually made of fiberglass or aluminum and is mounted atop the pickup truck bed. It usually covers the entire bed of the pickup truck, and is large enough to be used for camping purposes. Even though use for camping may have been its initial purpose, it now seems most often to be used for utility and storage purposes—particularly the protection of cargo from the elements and theft.

Another way of protecting contents inside a truck bed is through the use of a truck bed cover (also known as a tonneau cover), which is a low-profile truck accessory that mounts atop the truck bed and substantially covers the same. A truck bed cover does not rise up with the substantiality of a truck cap; rather, it is designed to nest atop the truck bed at a height similar to the top of the truck bed sidewalls. These truck bed covers are ordinarily constructed with aluminum frames and a fiberglass or plastic shell. Then, when the user desires to access the truck bed, the cover provides an access opening to the truck bed. One form of access opening associated with truck bed covers is through the use of hydraulic piston-cylinder actuators pivoting the truck cover between an open and closed position, wherein the user has access to the truck bed when the cover is in the open position. Another form of access opening associated with truck bed covers is through the use of a horizontally mounted retractable door moveable in a manner similar to the action of a roll-up door between an advanced position and a retracted position, wherein the user has access to the truck bed when the door is in the retracted position.

Issues continue to exist with truck covers as they are currently known in the art. Namely, truck covers only provide a single way of accessing the truck bed; either with the open/closed piston-cylinder actuated configuration or the advanced/retracted roll-up door configuration. Thus, a need exists for a truck cover that can provide a plurality of ways in which a user can access the truck bed. The present disclosure addresses these and other issues.

SUMMARY

This section provides a general summary of the disclosure, and is not a comprehensive disclosure of its full scope or all of its features.

In accordance with one aspect of the present disclosure, a tonneau cover system for a cargo box of a truck is provided. The cargo box can have a forward end and opposing first and second sides extending from the forward end. The tonneau cover system can include first and second side rails. Each side rail can have a forward end and rear end and can be pivotally mountable to the cargo box adjacent the first and second sides, respectively, so as to be pivotable about the forward ends between a raised position in which the rear ends of the first and second side rails are raised to provide a rear opening in an open pivot arrangement, and a lowered position in which the rear ends are adjacent the sides in a closed pivot arrangement. The first and second side rails can be spaced apart to define an inter-rail area between the first and second side rails. A door can include a plurality of rectangular elements. Each of the plurality of rectangular element can extend between the first and second side rails. The plurality of elements can be hingedly coupled together and movable between a closed door arrangement wherein the elements cover the inter-rail area, and an open door arrangement in which the elements are retracted to permit access through the inter-rail area.

Further aspects and areas of applicability will become apparent from the description provided herein. The description and specific examples in this summary are intended for purposes of illustration only and are not intended to limit the scope of the present disclosure.

DRAWINGS

Sample embodiments of the disclosure are set forth in the following description and shown in the drawings. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 15 is an operational top view of the present disclosure depicting the door moving from an advanced position towards a retracted position;

FIG. 16 is a top view of the present disclosure depicting the door in the retracted position;

FIG. 17 is a top view of a second embodiment of the truck cover of the present disclosure;

FIG. 17A is a cross-section view taken along line 17A-17A in FIG. 17;

FIG. 18 is an operational side view of an exemplary embodiment of the present disclosure depicting panels folded about lateral hinges and disposed in a stacked configuration;

Similar numbers refer to similar parts throughout the drawings.

DETAILED DESCRIPTION

Figure 1:
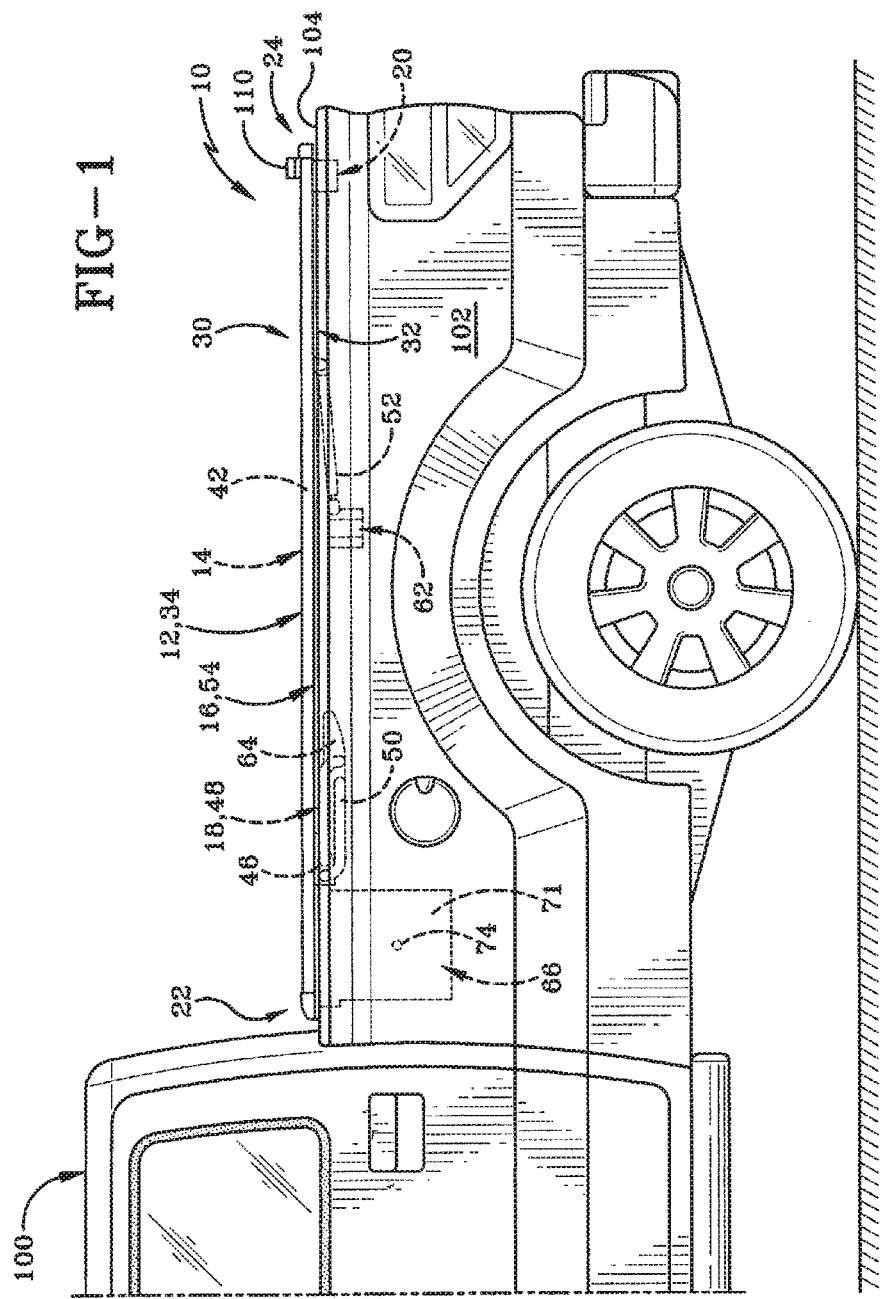
FIG. 1 is a side elevation view of an exemplary dual action truck bed cover of the present disclosure mounted adjacent the top of a truck bed and shown in a closed position.

As depicted throughout the figures, an example of a dual action truck bed cover of the present disclosure is generally indicated at 10. Truck bed cover 10, also referred to generally as cover 10 or truck cover 10 includes a frame 12, a door 14, a base 16, a hinge assembly 18, and a dual action latch assembly 20. Frame 12 is moveable between open and closed pivot positions and, furthermore, door 14 is moveable between advanced or closed door and retracted or open door positions.

As depicted in FIG. 1, cover 10 is shown in a closed position carried by a truck 100 and a portion of cover 10 extending over the truck bed 102. Base 16 of cover 10 is mounted adjacent the top bed walls of the truck below the frame 12, with frame 12 carried above base 16.

Figure 2:
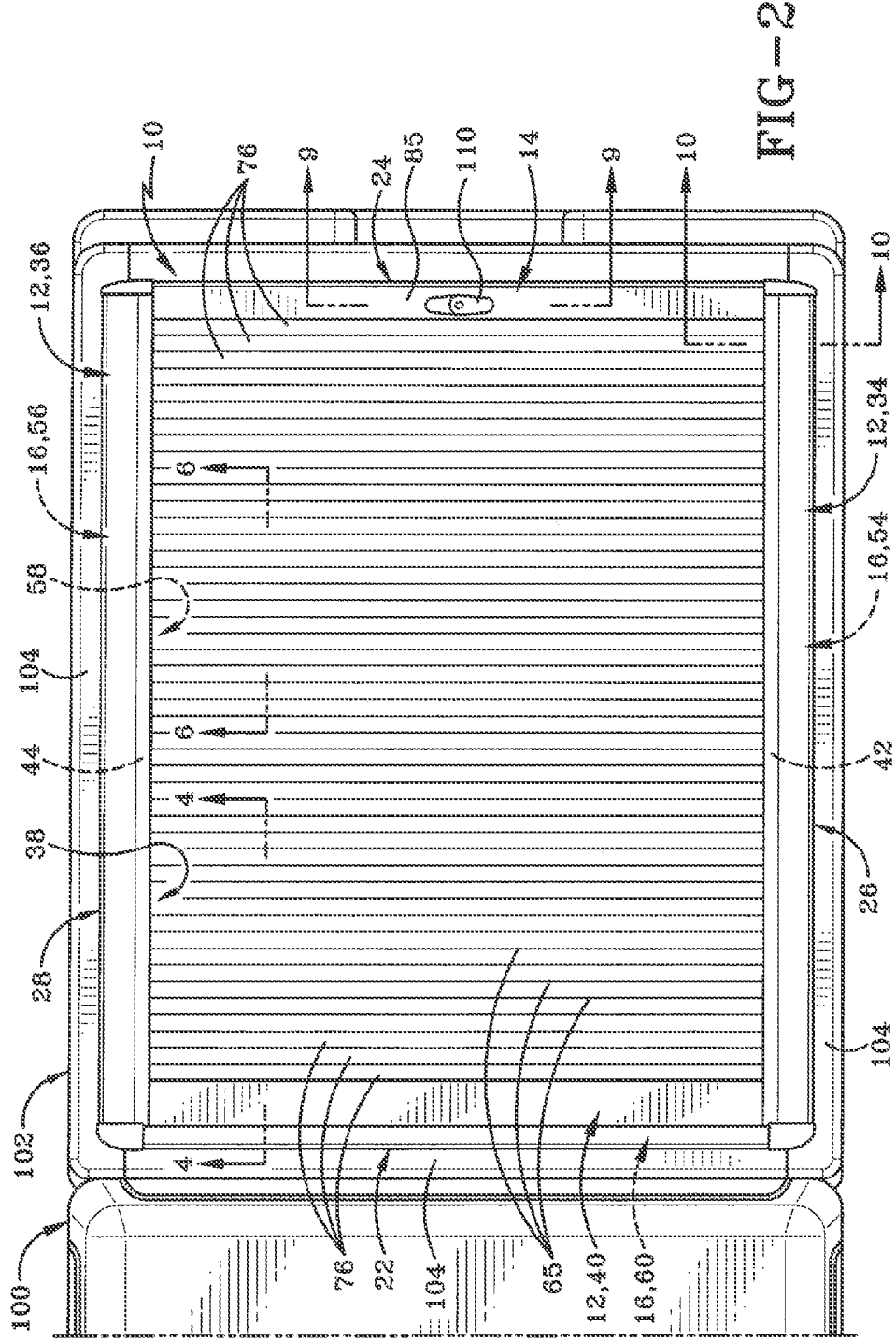
FIG. 2 is a top view of the dual action truck bed cover of FIG. 1.
Figure 3:
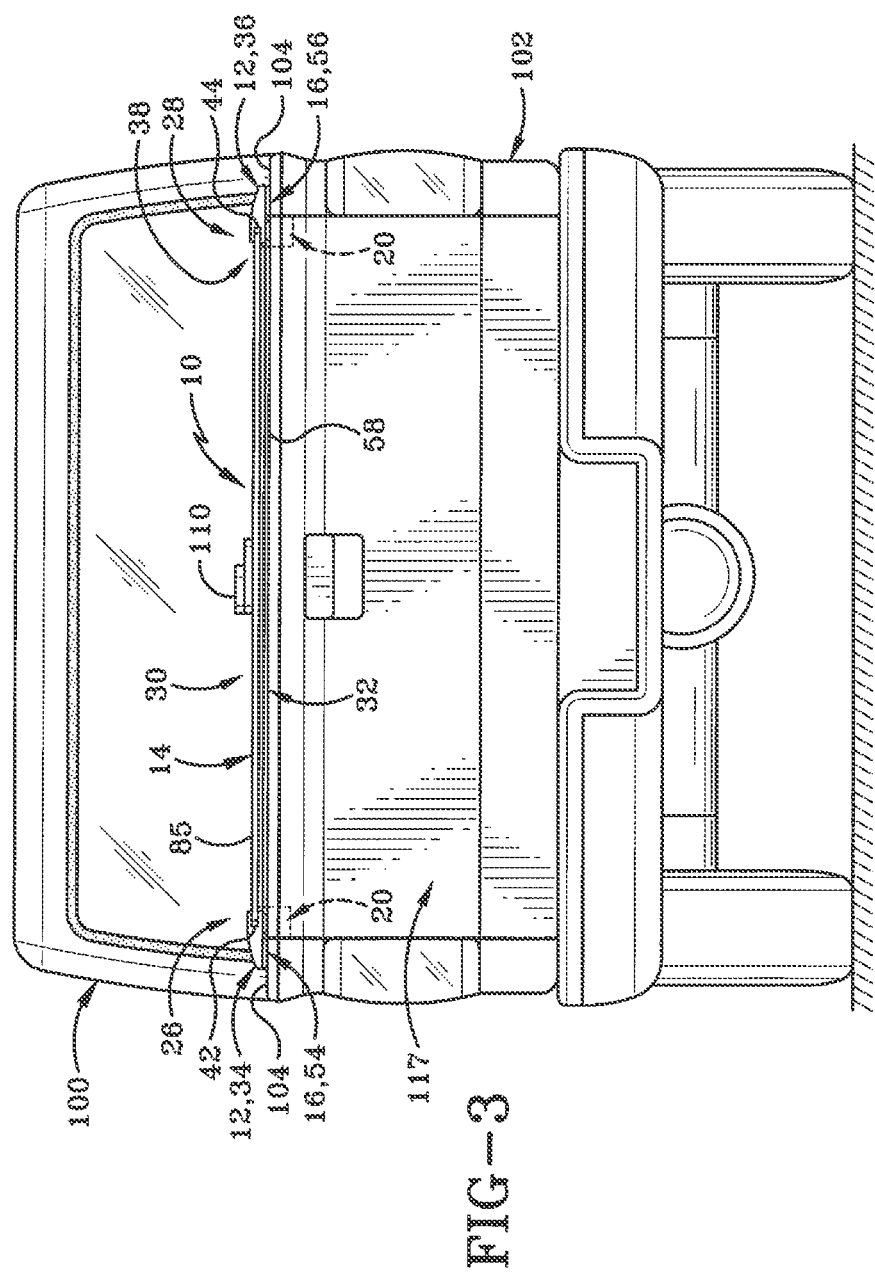
FIG. 3 is a rear elevation view of the dual action truck bed cover of FIG. 1.

As depicted in FIG. 2 and FIG. 3, in some embodiments the truck cover 10 includes a forward end 22 spaced opposite a rear end 24 defining a longitudinal direction therebetween. A left side 26 is spaced apart and opposite a right side 28 defining a lateral direction therebetween. A top 30 is spaced apart and opposite a bottom 32 defining a vertical direction therebetween.

In some embodiments, frame 12 includes a first longitudinally extending member 34 spaced apart and generally parallel to a second longitudinally extending member 36. Longitudinal members 34, 36 define a portion of a first or upper inter-rail area or opening 38 therebetween. First and second longitudinal members 34, 36 are parallel and extend substantially from front end 22 to rear end 24. Each of the first and second longitudinal members 34, 36 is entirely above base 16 and therefore constitutes upper side rails 34, 36. A first lateral member 40 extends laterally between forward ends of the first and second longitudinal members 34, 36. A first or upper laterally extending or lateral member 40 bounds a forward end of opening 38. In one particular embodiment, lateral member 40 is fixedly secured to each of the first and second longitudinal members or upper side rails 34, 36. First and second longitudinal members 34, 36 and lateral member 40 are preferably constructed from aluminum yielding strength to truck cover 10 while simultaneously being lightweight in construction.

In some embodiments, each longitudinal member 34, 36 defines a longitudinally extending C-shaped channel therein. A first C-shaped channel 42 (See also FIG. 7) extends longitudinally from forward end 22 to rear end 24 in first longitudinal member 34. A second C-shaped channel 44 extends from forward end 22 to rear end 24 in second longitudinal member 36. Each channel 42, 44 face first opening 38 and bounds the respective left and right sides of the opening. As will be described in greater detail below, first channel 42 and second channel 44 receive respective left and right edges of door 14 permitting door 14 to slide along the aligned channels 42, 44. While reference is made to certain elements along one side of truck cover 10, it is to be clearly understood that duplicated elements thereof may exist and are similarly situated and connected along the other side of truck cover 10.

As depicted in FIG. 4 through FIG. 8, in some embodiments, base 16 includes a first or left longitudinal member or side rail 54 and a second or right longitudinal member or side rail 56 defining a second or lower inter-rail area or opening 58 therebetween. Each of the first and second longitudinal members 54, 56 is entirely below the frame 12 and therefore constitutes lower side rails 54, 56. Second opening 58 is positioned below frame 12 and is aligned with opening 38 defined by frame 12, each opening 38, 58 is configured to provide access to a pickup truck bed 102 when either frame 12 is in the open position or door 14 is in the retracted position. Longitudinal members 54, 56 of base 16 extend longitudinally spaced apart and generally parallel from front end 22 to rear end 24. Longitudinal members 54, 56 are preferably constructed from a lightweight aluminum material similar to that of base 12 and hinge assembly 18.

A second or lower lateral member 60 may extend between longitudinal member 54 and longitudinal member 56 adjacent each forward end. When cover 10 is in the closed position, lateral member 40 is disposed above lateral member 60. Base 16 may further include a coupler 62 for coupling each longitudinal member 54, 56 to the pickup truck. Downwardly extending housing 66 includes a laterally extending forward wall 68 positioned forwardly from a laterally extending rear 70 defining a portion of a chamber 72 therebetween. Housing 66 further includes a bottom wall 69 and sidewalls 71. A spindle 74 extends laterally through chamber 72 adjacent the middle of the chamber such that when frame 12 is in the closed position but door 14 is in the retracted position, portions of door 14 are wound about spindle 74 as will be described in greater detail below.

In some embodiments, hinge assembly 18 couples frame 12 to base 16 adjacent the forward end of frame 12. A flange 46 extends downwardly from a rigid connection with longitudinal member 34. A first leg 48 is pivotably connected to flange 46 and extends from flange 46 towards base 16. A second leg 50 is pivotably connected to flange 46 and extends towards base 16. When viewed from the side, a portion of second leg 50 is positioned forwardly from first leg 48 when frame 12 is in the open position. Each first and second leg 48, 50 is a J-shaped configuration positioned in a mirrored configuration for receiving a portion of the other leg nestingly therein when frame 12 is in the closed position. A flange 64 extends from first a longitudinal member 56 on base 16 pivotably coupling the bottom ends of first leg 48 and second leg 50 to base 16. A downwardly extending housing 66 is positioned forwardly of flange 64.

Figure 6:
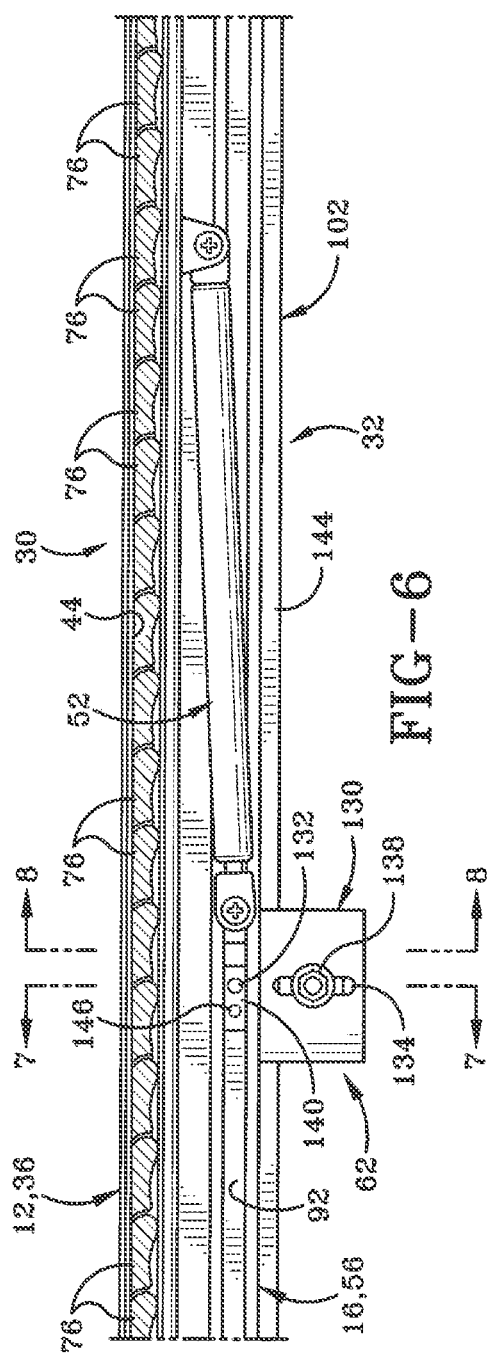
FIG. 6 is a longitudinal cross-section taken along line 6-6 in FIG. 2 depicting a hydraulic actuator for moving a frame relative to a base.
Figure 7:
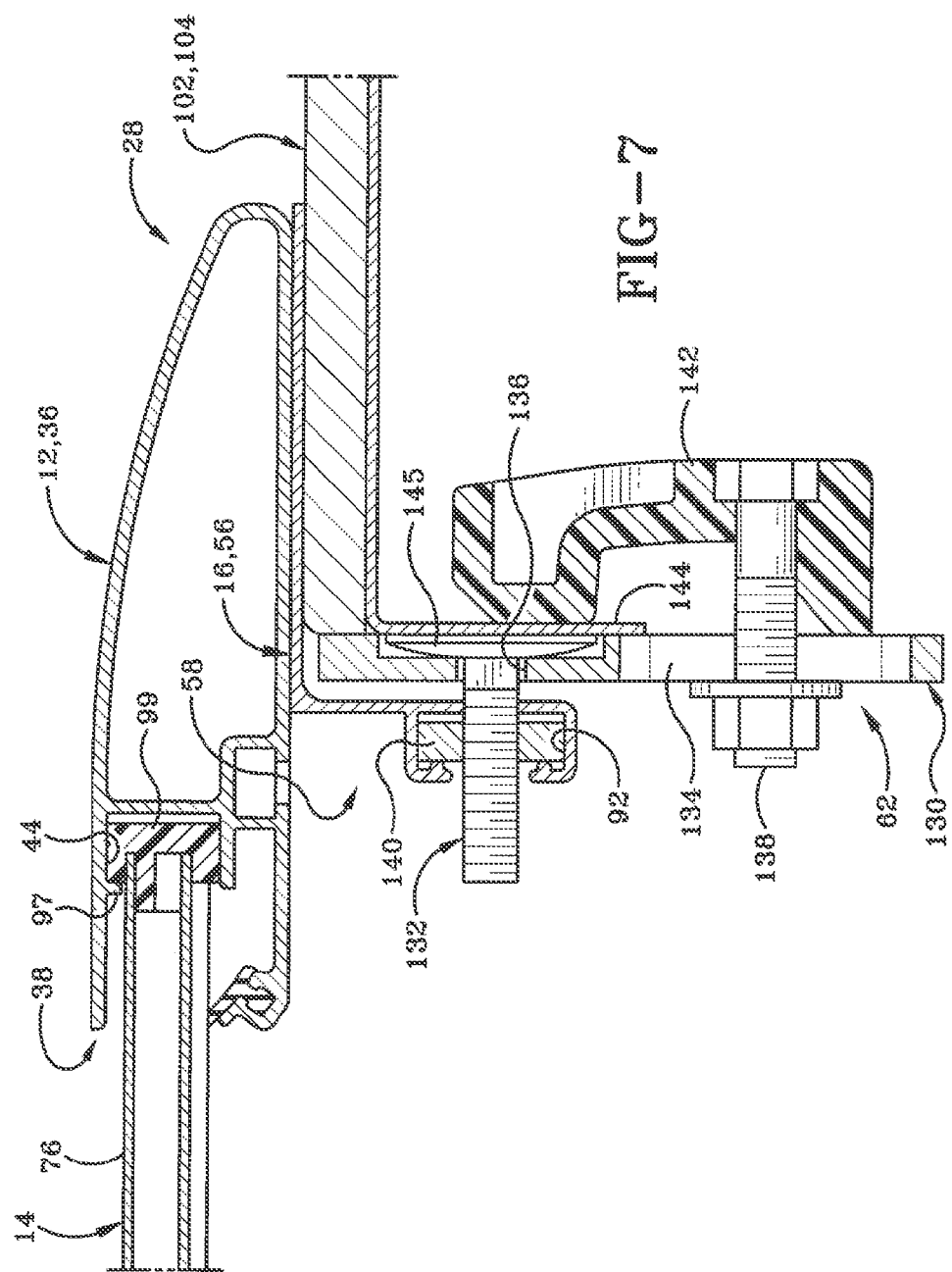
FIG. 7 is a lateral cross-section taken along line 7-7 in FIG. 6 depicting the connection of a base to the truck via a coupler.
Figure 8:
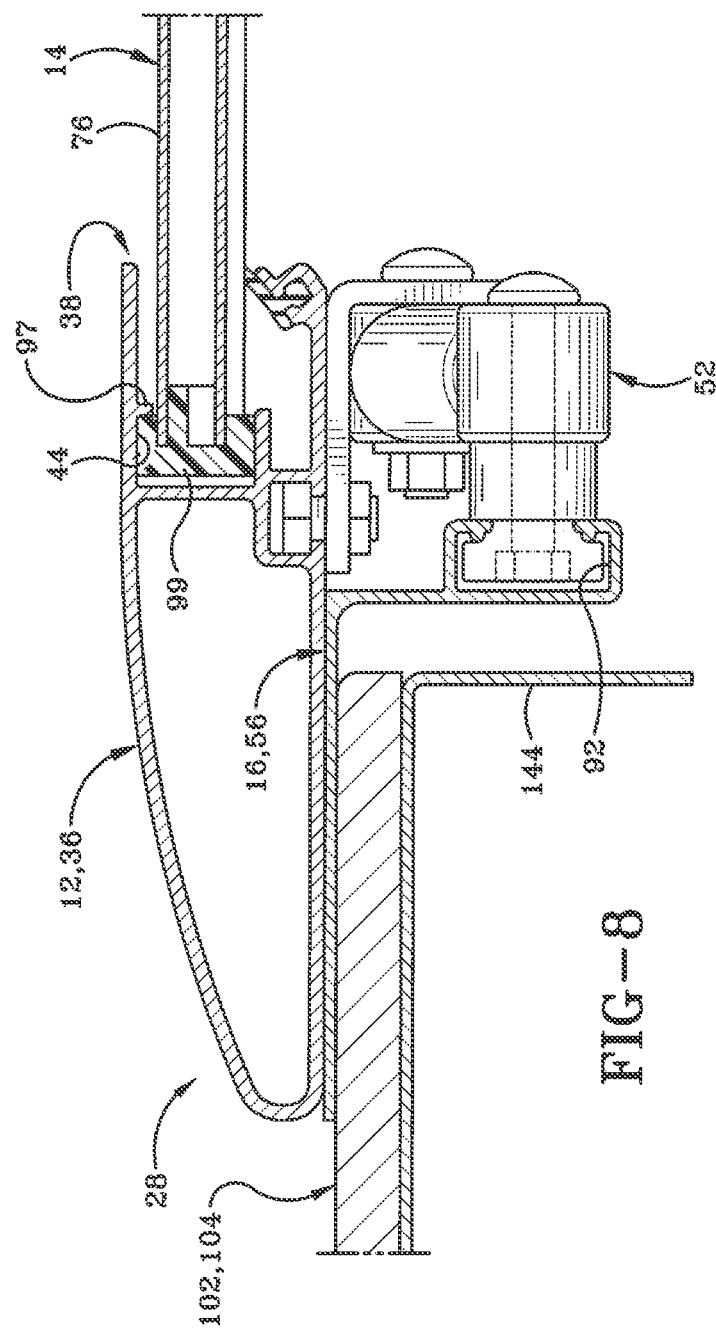
FIG. 8 is a lateral cross-section taken along line 8-8 in FIG. 6 depicting the connection of the hydraulic actuator to the base and the frame.

As depicted in FIG. 6 through FIG. 8, in some embodiments, coupler 62 includes a clamp plate 130, an elevator carriage bolt 132, a vertical first slot 134, a longitudinal second slot 136, a securing bolt 138, and an insert 140. Clamp plate 130 is secured via bolt 138 to hook member 142 of pinch lip 144 of truck bed. An upper lip 144 of truck bed is sandwiched between hook member 142 and clamp plate 130. Bolt 138 extends through vertical slot 134 at a vertical height lower than longitudinally extending second slot 136. A head 145 on carriage bolt 132 is disposed within a recess as bolt 132 extends through second slot 136, wherein the square neck portion of bolt 132 rests squarely in the slot. Insert 140 is held in channel 92 and threadably receives the threaded portion of bolt 132. Insert may be held in channel 92 by set screw 146.

In some embodiments, a hydraulic actuator 52 is connected to frame 12 at a rear end and connected to base 16 at a forward end, wherein the forward end of actuator 52 is positioned rearwardly from first leg 48. Actuator 52 is a hydraulic piston and cylinder actuator configured to assist in the lifting of frame 12 from the closed position to an open position.

Figure 14:
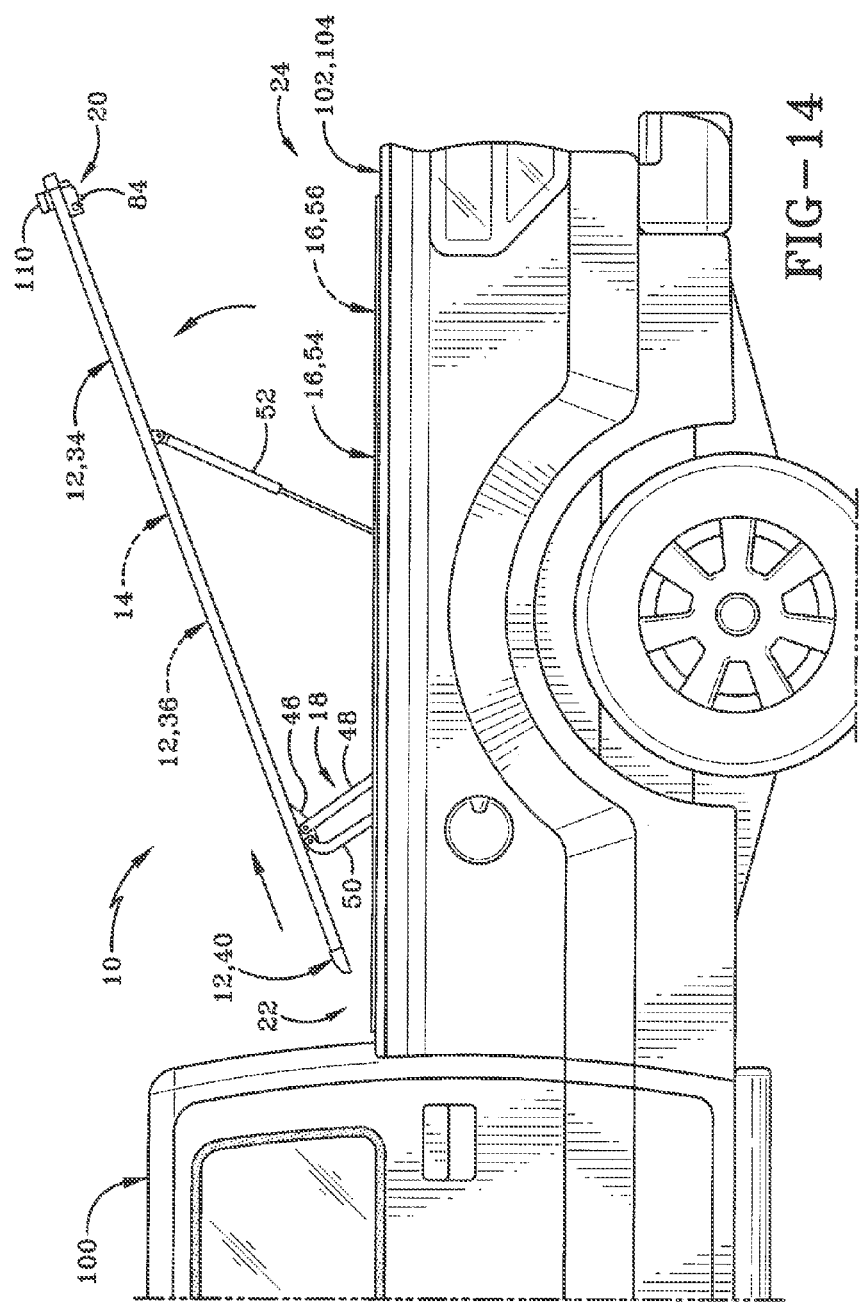
FIG. 14 is a side elevation view of an exemplary dual action truck bed cover of the present disclosure mounted adjacent the top of a truck bed and shown in an open position.
Figure 20:
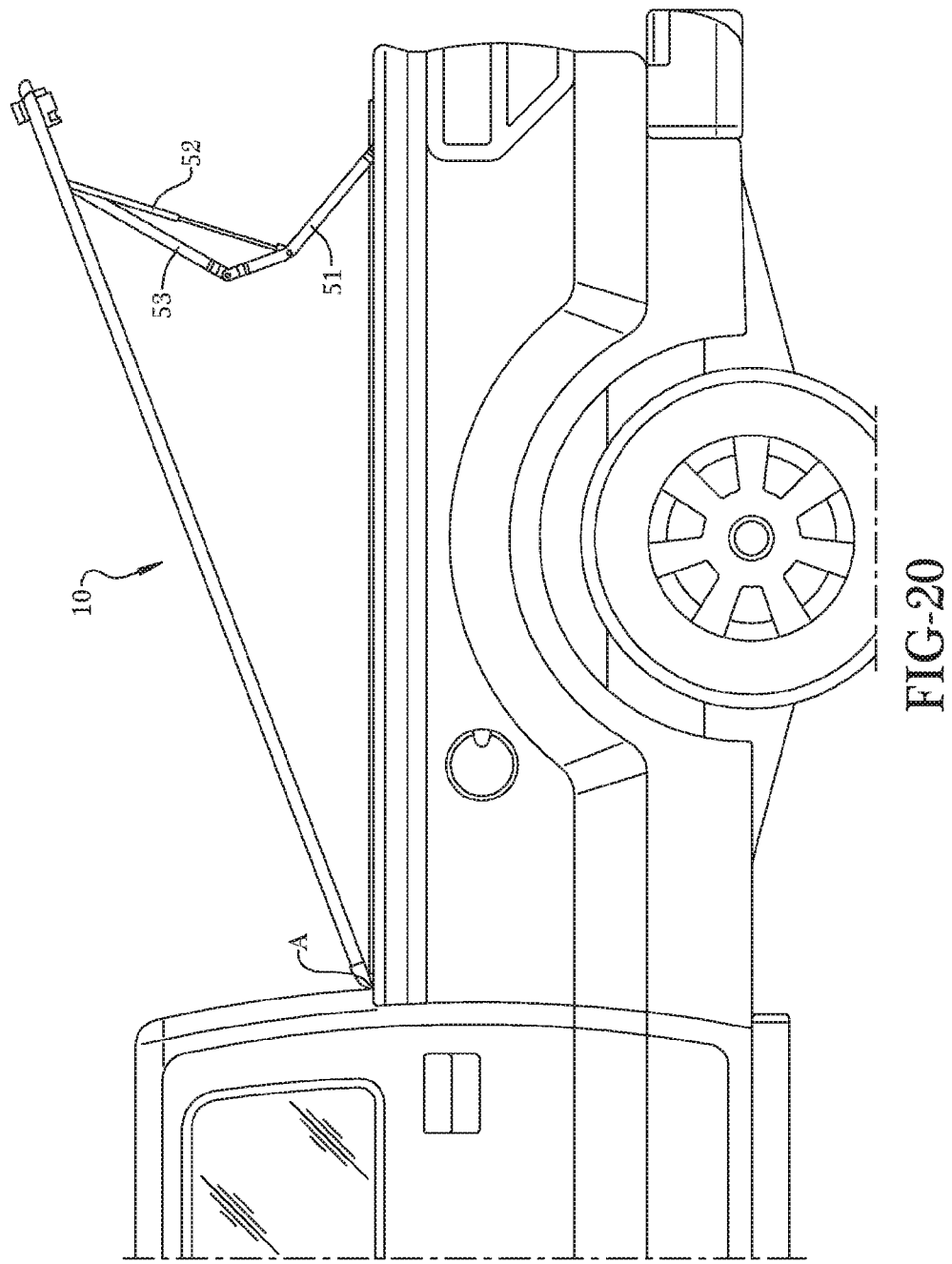
FIG. 20 is a side elevation view of an exemplary dual action truck bed cover of the present disclosure mounted adjacent the top of a truck bed and shown in an open position.
Figure 21:
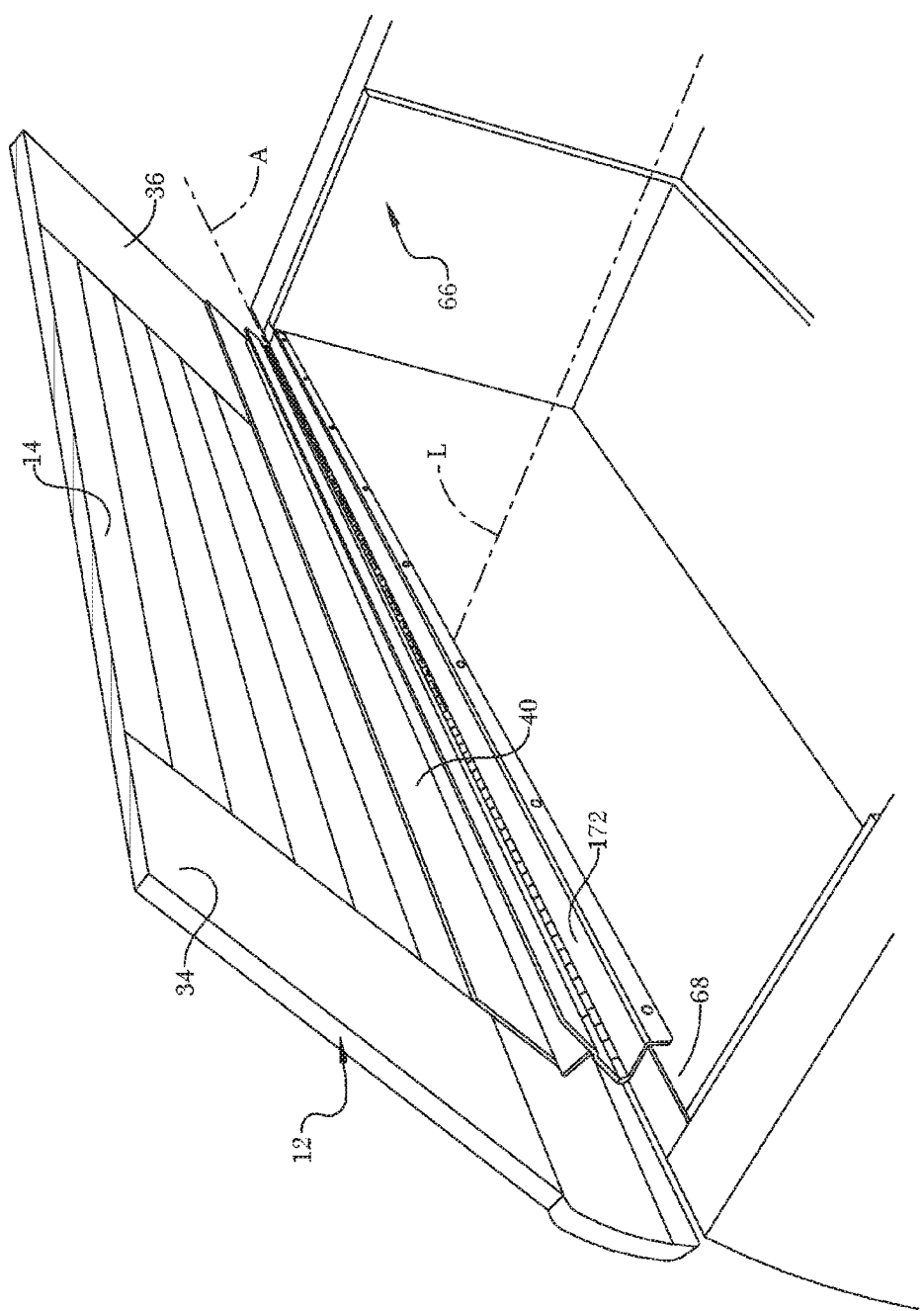
FIG. 21 is a fragmentary perspective view of the exemplary embodiment of FIG. 20 showing the hinge and coupling arrangement.

As depicted in FIG. 20 and FIG. 21, in some embodiments, frame 12 can be pivotable via rotation about a stationary pivot axis A. In addition, the frame 12 can be pivotable about a non-stationary or movable axis, such as where both the forward and rear ends of the frame 12 translate and rotate with the rear end being raised a greater distance than the forward end as they rotate as depicted in FIG. 1 and FIG. 14. As illustrated in FIG. 20 and FIG. 21 the stationary pivot axis A, extends laterally, and substantially perpendicular to the longitudinal first and second side rails 34, 36 and to the longitudinal axis of the truck L. A forward end of the frame 12 can be pivotably coupled to the forward end of the truck box 102. For example, a laterally extending piano hinge 172 can couple the lateral member 40 of frame 12 to the forward wall 68 of the housing 66. As also depicted, in some embodiments, the gas actuator 52 can be coupled between the frame 12 and base 16 via a plurality of pivotably coupled link arms 52, 53.

As depicted in FIG. 2 through FIG. 8, in some embodiments, door 14 includes a plurality of tandemly aligned panels 76 extending from forward end 22 to rear end 24 and extending from left side 26 to right side 28. Panels 76 include a lateral width that is greater than a longitudinal width. This configuration causes door 14 to be shaped similar to a plurality of slats hingedly connected 65 to each other at their respective forward and rear ends. The hinge configuration 65 is accomplished by a laterally extending channel in each panel filled with seal 89 to receive a complementary channel on the adjacent panel. End caps 99 connect to the lateral ends or longitudinal sides of each panel 76 and held in channel 44 by downwardly extending stop 97. End caps 99 are constructed from a polymer material that slides along metal in a smooth manner. Each panel 76 includes a left end and a right end wherein their respective left and right ends slide along first and second channels 42, 44 respectively.

Figure 22:
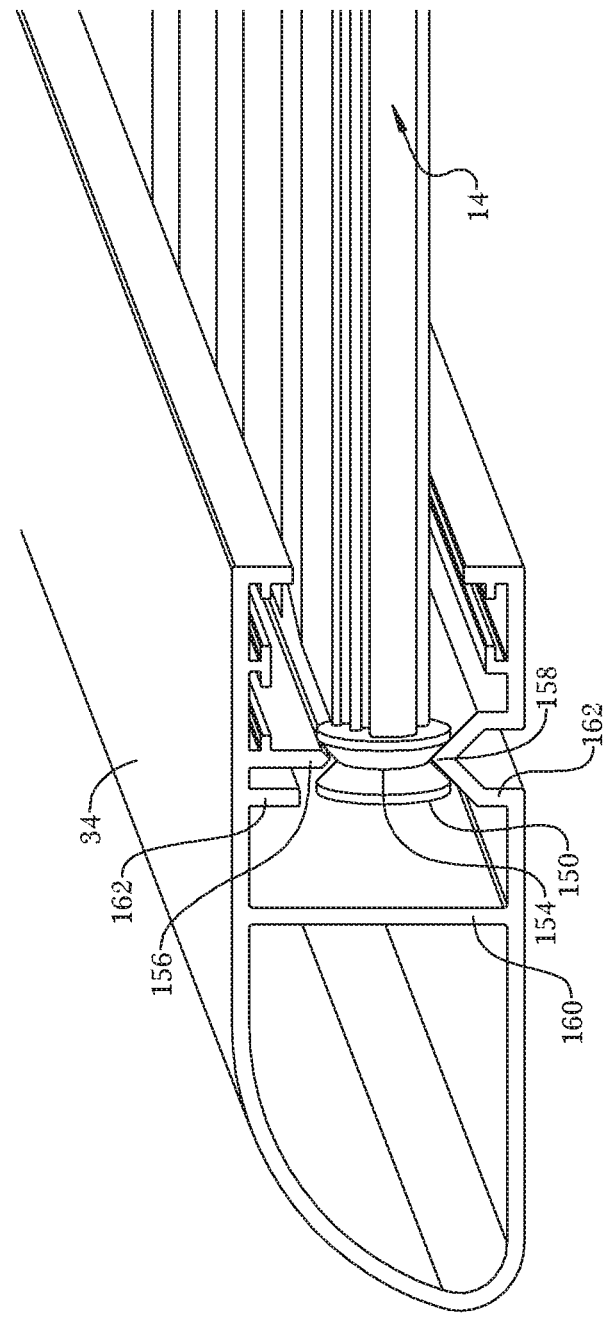
FIG. 22 is a fragmentary perspective view of an exemplary wheeled door embodiment.
Figure 23:
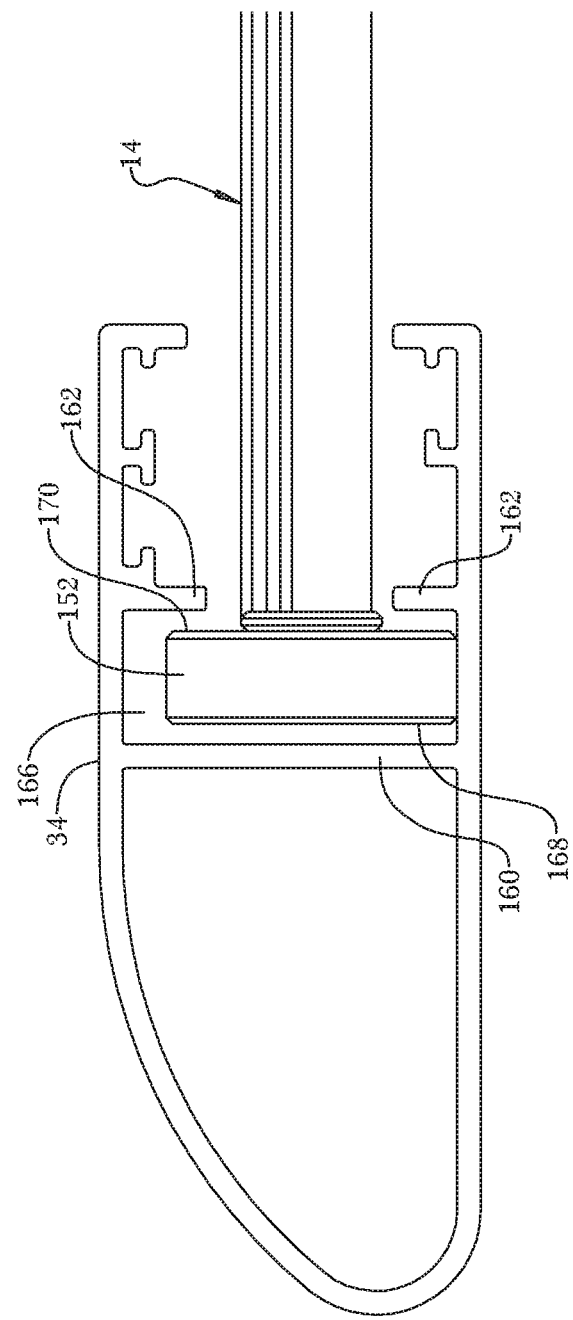
FIG. 23 is a fragmentary perspective view of an exemplary wheeled door embodiment similar for FIG. 22.

As depicted in FIG. 22 and FIG. 23, in some embodiments wheels 150, 152 can be coupled to lateral ends or along opposing longitudinal sides of the door 14 or door panels, slats, or rectangular elements 76. The wheels 150, 152 can facilitate movement of the door 14 between the open and closed door positions or arrangements. In some cases, the wheels 150, 152 or the end caps 99 can cooperate with the side rails 34, 36 of the frame 12 to help maintain the desired lateral distance and parallel orientation between the side rails 34, and 36. For example, as shown in FIG. 22, wheels 150 coupled to opposite longitudinal sides of the door slats, or rectangular elements 76 can have a circumferential groove 154. One or more protrusions 156, 158 of the upper side rails 34, 36 can extend into the circumferential groove 154 of wheels 150 coupled to a first longitudinal side of the door slats, or rectangular elements 76 and received within the first longitudinal side rail 34. Similar protrusions 156, 158 of the second longitudinal side rail 36 of the frame 12 can extend into the circumferential groove 154 of wheels 150 coupled to a second, opposite longitudinal side of the door 14. Thus, engagement of the protrusions 156, 158 within the groove 154 of the wheels 150 helps maintain the desired lateral distance and parallel orientation between the upper side rails 34, 36.

As another example depicted in FIG. 23, wheels 152 coupled to opposite longitudinal sides of the door slats, or rectangular elements 76 can be captured between a plurality of protrusions 160, 162 of the respective upper side rails 34, 36. In the depicted example, the protrusions 162, 164 of the upper side rails 34, 36 define a channel 166 that retains the wheels 152. Respective engagement between opposing protrusions 160, 162 and the opposite sides 168, 170 of the wheels 152 help maintain the desired lateral distance and parallel orientation between the upper side rails 34, and 36.

In some embodiments, both wheels 150 having a circumferential groove 154 receiving groove protrusions 156, 158 of the upper side rails 34, 36 and wheels 152 with opposite sides 168, 170 captured between opposing protrusions 160, 162 of the upper side rails 34, 36 can be used together. For example, one or more of the door slats or rectangular elements 76 can have both types of wheel/protrusion arrangements on each of the longitudinal sides of the slat 76. As seen in FIG. 22, the upper side rails 34, 36 can include both the opposing protrusions 160, 162 for capturing the wheel 152 therebetween and protrusions 156, 158 extending into the circumferential groove 154 of the wheels 150. As another example, alternating door slats or rectangular elements 76 can alternatingly have the grooved wheel and protrusion arrangement or the side-captured wheel between opposing longitudinally extending protrusions. In some cases, selected slats or rectangular elements 76 adjacent the rear of the door 14 will include at least one type of arrangement to help maintain the desired lateral distance and parallel orientation between the upper side rails 34, 36, while selected slats or rectangular elements 76 adjacent a forward end of the door 14 may not include any type of such arrangements.

Figure 4:
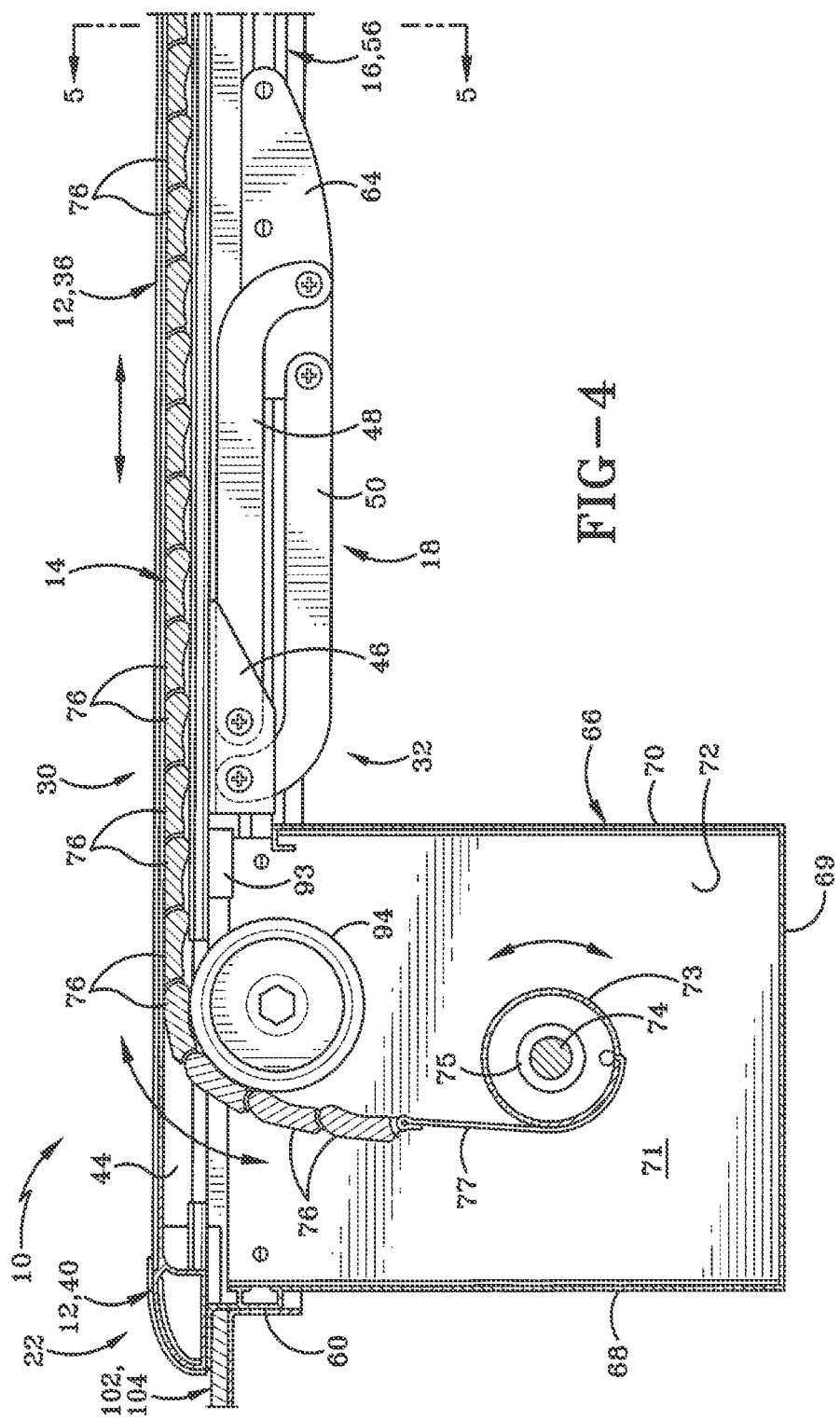
FIG. 4 is a longitudinal cross-section taken along line 4-4 in FIG. 2 depicting a housing for storing a slidable door in a stored position and a hinge assembly positioned rearwardly from the housing.
Figure 5:
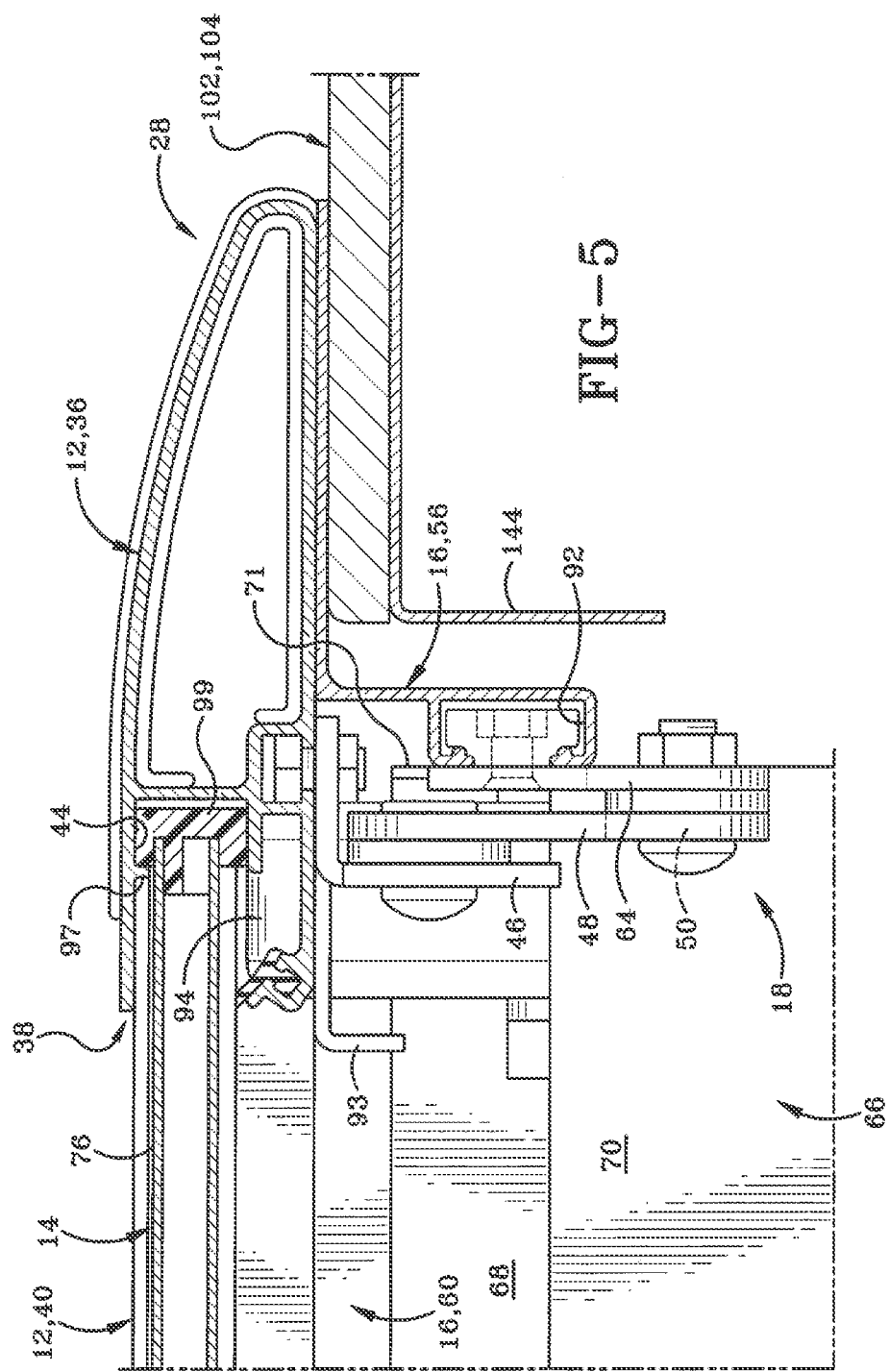
FIG. 5 is a lateral cross-section taken along line 5-5 in FIG. 4 depicting an end view of the hinge assembly.
Figure 9:
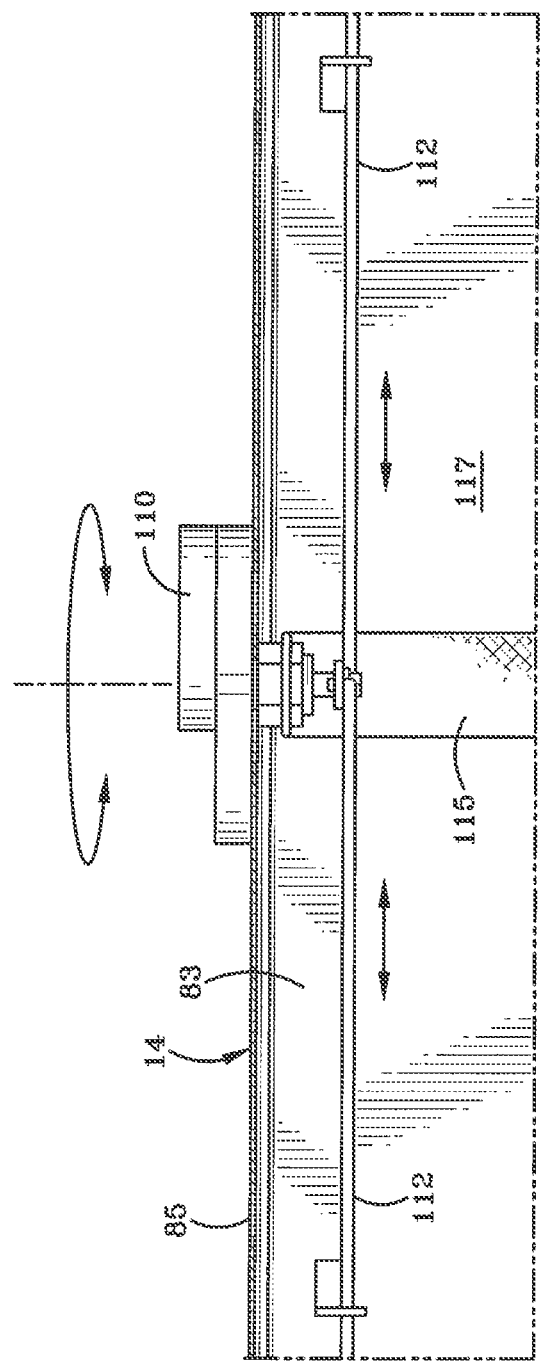
FIG. 9 is a lateral cross-section taken along line 9-9 in FIG. 2 depicting a rotatable handle operatively coupled to a pushrod.
Figure 10:
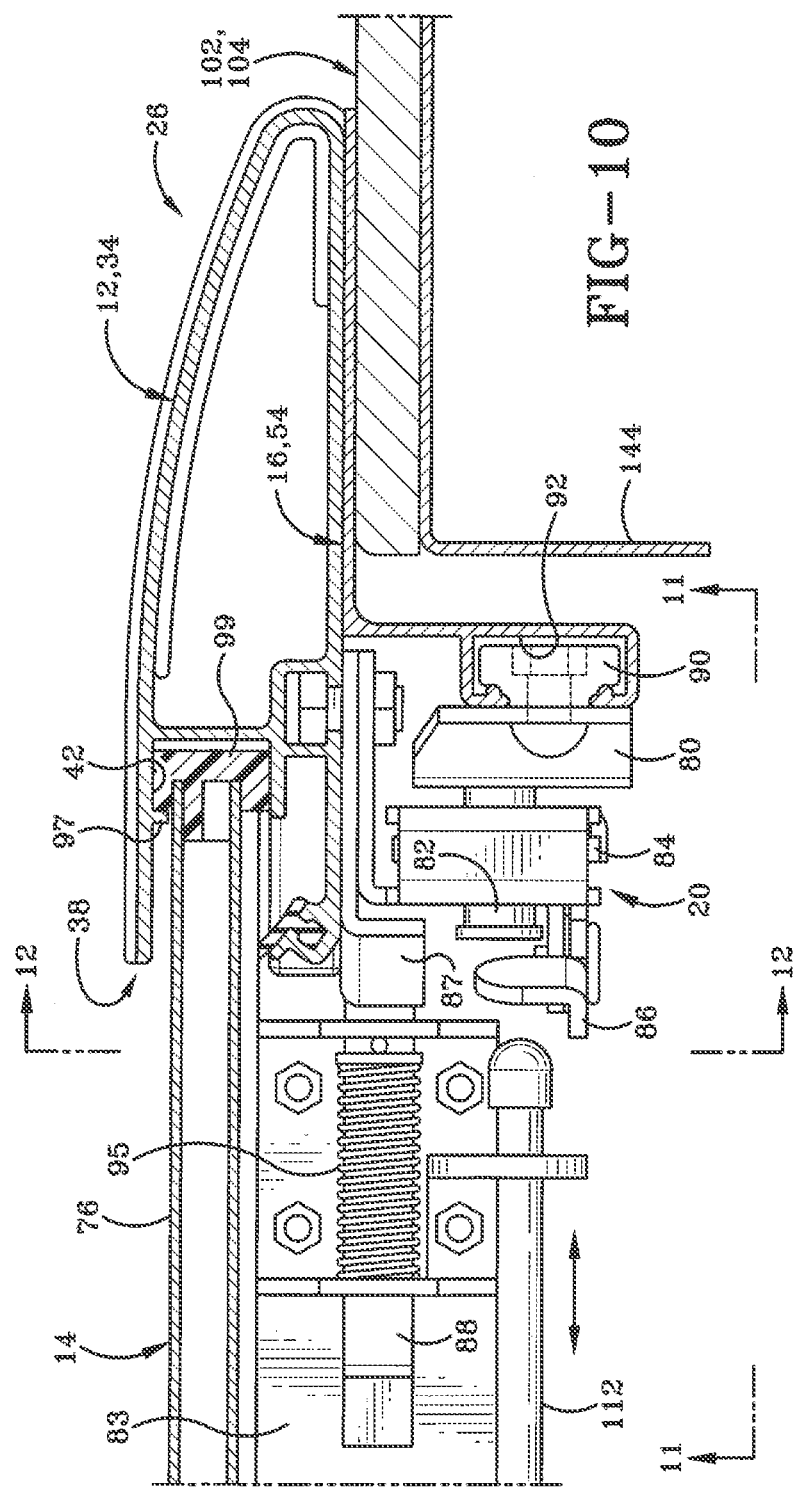
FIG. 10 is a lateral cross-section taken along line 10-10 in FIG. 2 depicting a dual action latch assembly.

As depicted in FIG. 9, in some embodiments, a rearmost panel 85 of the door can include a downwardly extending flange 83 that defines the rear end of door 14. Flange 83 contacts the tailgate 117 when door 14 is in the advanced position and the tailgate 117 is closed. Door 14 is moveable between an advanced position (FIG. 1) and a retracted position (FIG. 16). As depicted in FIG. 4, in some embodiments, the plurality of tandemly connected panels 76 are adapted to wind about spindle 74 in the retracted position. A pair of wheels 94 may be disposed adjacent the top of housing 66 between walls 68 and 70. Wheels 94 may be rotatably mounted on each respective left and right side of truck cover 10. Wheels 94 assist in the movement of door 14 partially therearound as door 14 winds about spindle 74. A door stop 93 may be positioned to stop second latch 88 and hold door against the winding force of a torsion spring 75.

As depicted in FIG. 9 through FIG. 13, latch assembly 20 includes a mounting bracket 80, a laterally extending rod 82, a latch 84, a lever 86, and a second latch 88. Mounting bracket 80 is coupled near the rear end of longitudinal member 56 of base 16. In one particular example, bracket 80 is coupled to an insert 90 disposed within a channel 92 defined by longitudinal member 56 of base 16. Channel 92 is a C-shaped channel configured to receive insert 90 therein and channel 92 is below channel 42 on longitudinal member 34 of frame 12. The lateral rod 82 extends inwardly towards the center of the truck from bracket 80 terminating at an end and having a generally circular cross-section.

Latch 84 is spring-loaded and able to releasably secure rod 82 by selective movement of operatively coupled lever 86. The movement of latch 84 is associated with a first action operatively coupled to the opened and closed position of frame 12. The actuation of lever 86 in a first direction may release latch 84 to a neutral position allowing frame 12 to lift up, causing latch 84 to pivot vertically downwards as frame 12 moves from the closed position to the open position. In a reverse manner, as frame 12 is moved from an open position towards a closed position, latch 84 contactingly engages lateral rod 82 to pivoting upwards as frame 12 moves downward and the neutral engagement of lever 84 allows rod 82 to pass thereby. Then the spring engagement locks lever 84 in place securing frame 12 in the closed position.

Figure 11:
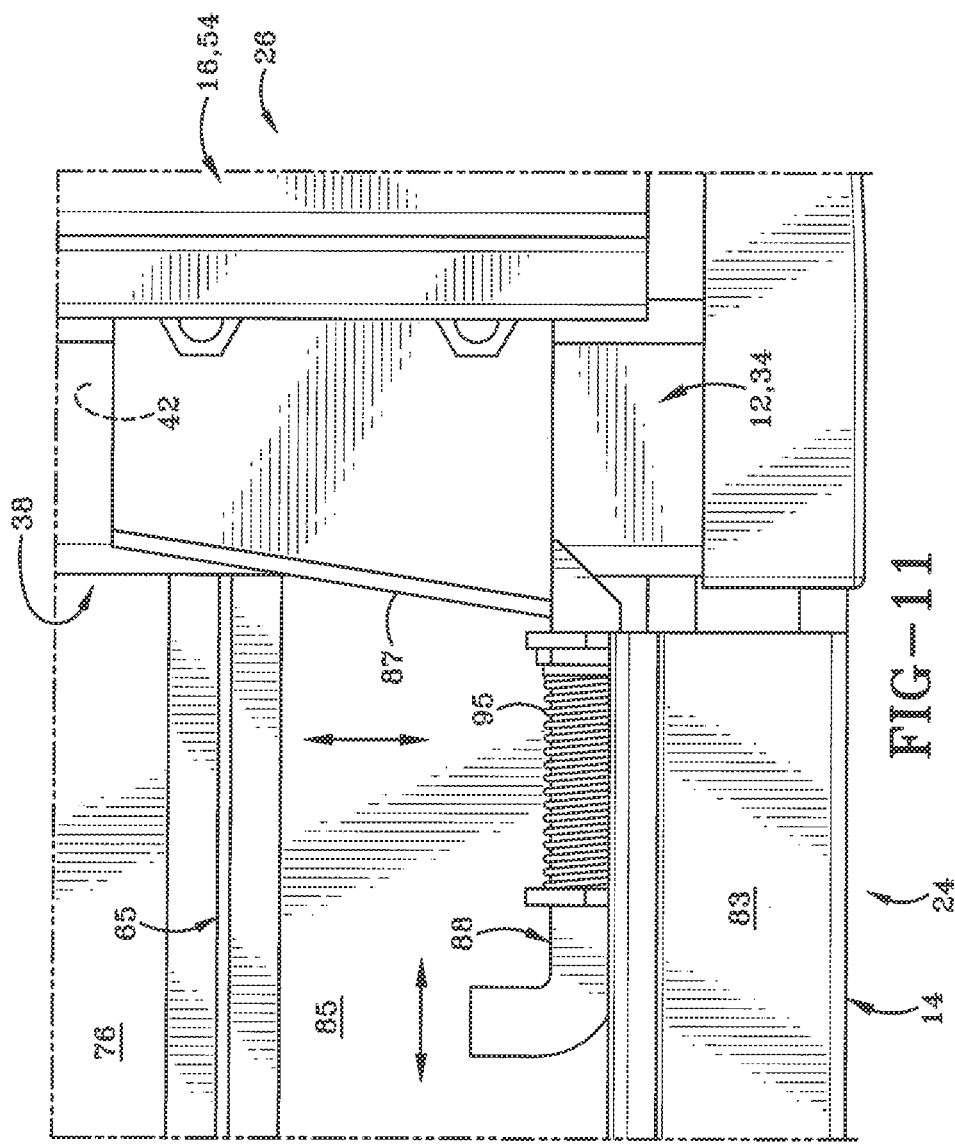
FIG. 11 is a bottom view taken along line 11-11 in FIG. 10.
Figure 12:
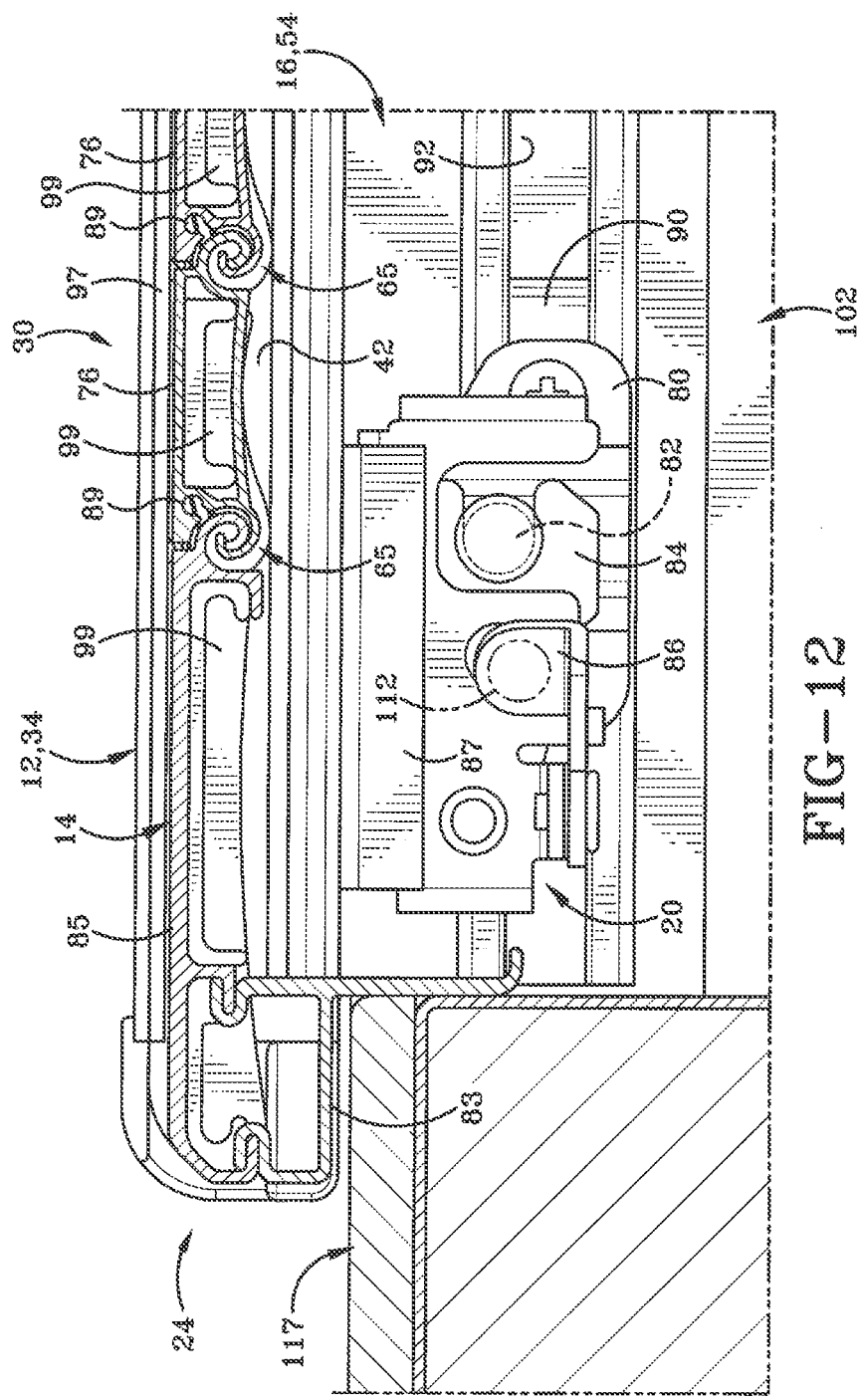
FIG. 12 is a longitudinal cross-section view taken along line 12-12 in FIG. 10.
Figure 13:
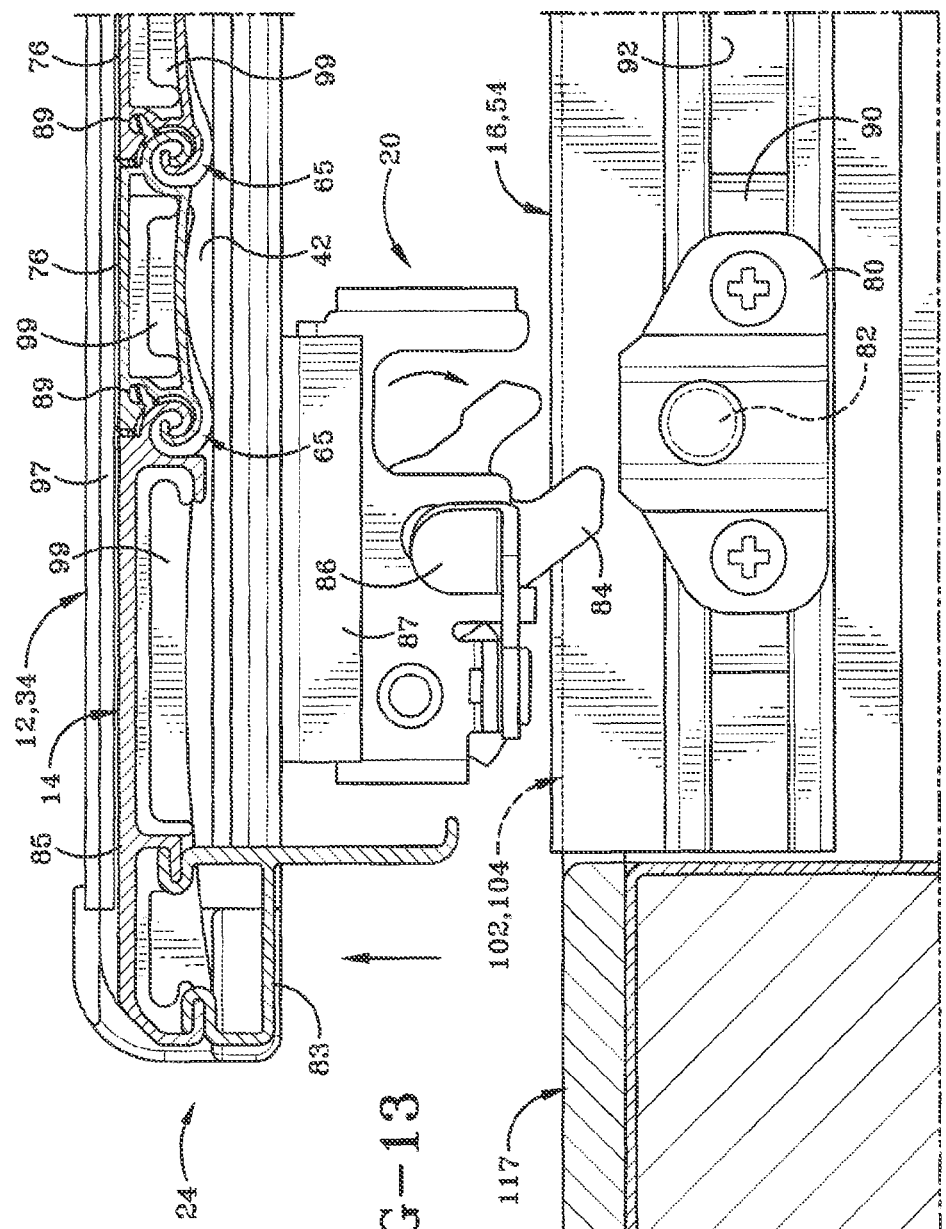
FIG. 13 is a longitudinal cross-section view taken along line 12-12 in FIG. 10 depicting operational movement of the frame relative to the base.

As depicted in FIG. 11, movement of second latch 88 in the second direction is associated with a second action and is operatively connected to the movement of door 14 between an advanced position and a retracted position. As second latch 88 is moved in a second direction against a spring force 95, an engagement with a catch plate 87 is released, ordinarily securing door 14 in the advanced position, allowing a user to push door 14 towards the forward or front end 22, sliding said door 14 along first and second channels 42, 44, wherein the plurality of panels 76 are wound about spindle 74 inside chamber 72. Catch plate 87 tapers or is sloped when viewed from below. The sloped angle of catch plate 87 pushes a distal end of latch 88 inwardly against spring 95 as door 14 moves toward the advanced position.

In one particular embodiment, a rotatable handle 110 operatively coupled with pushrod 112 may be a part of latch assembly 20. The operative coupling of handle 110 to pushrod 112 is a rotation-to-translation manner as one having ordinarily skill in the art would understand. As handle 110 rotates, it imparts a linear translation of pushrod 112. As pushrod 112 linearly translates, the end of pushrod 112 may contact lever 86 to release latch 84 allowing frame 12 to move from the closed position to the open position.

Figure 24:
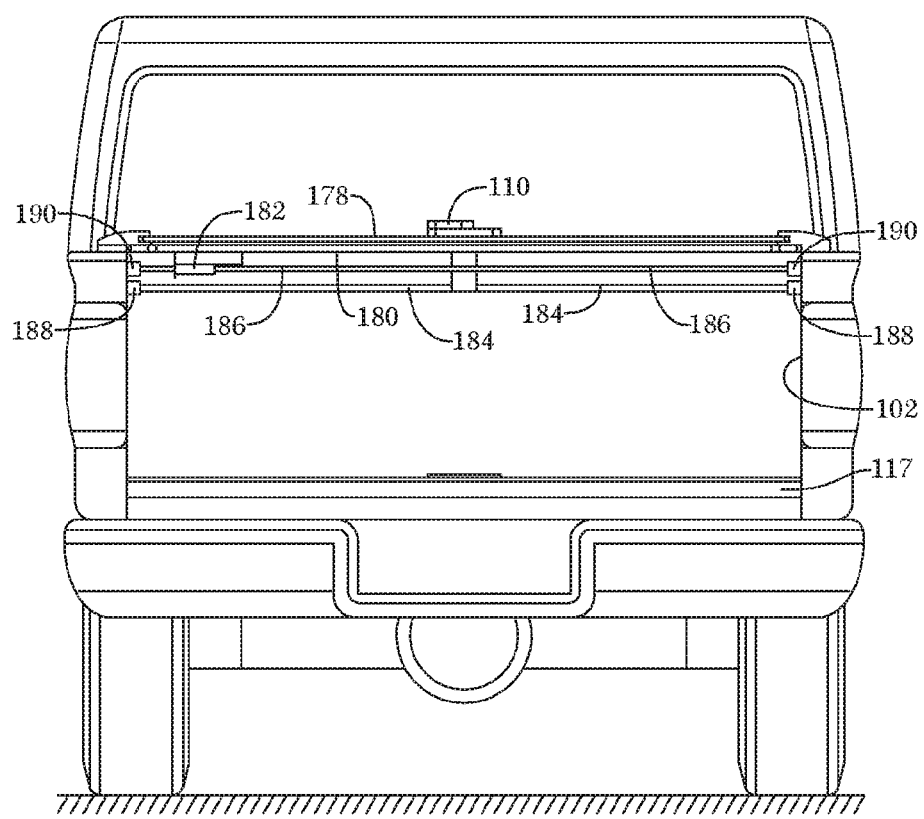
FIG. 24 is a rear elevation view of a truck with the tailgate open and an exemplary latching or locking mechanism.

As depicted in FIG. 24, some embodiments can include an exterior or first latch handle 110 on an exterior side 178 of the cover 10 or otherwise positioned to be accessible from the exterior of the cover 10 when the frame 12 is in the closed pivot arrangement or position and the door 14 is in the advanced or closed door position or arrangement. A second latch handle 182 can be provided on an interior side 180 of the cover 10, or otherwise positioned to be inaccessible from the exterior of the cover 10 when the frame 12 is in the closed pivot position or arrangement and the door 14 is in the advanced or closed door position unless the tailgate 117 is in an open position.

In some embodiments, the exterior latch handle 110 can operate to latch the frame 12 in the closed pivot position or arrangement and interior latch handle 182 can operate to latch the door 14 in the closed door position or arrangement. For example, ends of pushrods or linkages 184 operably coupled to the exterior latch handle 110 can operably engage the lower side rails 54, 56 of the base 16, directly or via a latch mechanism or bracket 188, when in a latched position or arrangement to prevent pivoting of the upper frame 12 relative to the lower base 16. When the exterior latch handle 110 is rotated or otherwise moved to an unlatched position, the ends of pushrods 184 can operably disengage lower side rails 54, 56, allowing the frame 12 to be pivoted to the open pivot position or arrangement.

Similarly, ends of pushrods or linkages 186 operably coupled to the interior latch handle 182 can operably engage upper side rails 34, 36 of the upper frame 16, directly or via a latch mechanism or bracket 190, when in a latched position or arrangement to prevent movement of the door 14 relative to the frame 16 toward the open door position or arrangement. When the interior latch handle 182 is rotated or otherwise moved to an unlatched position or arrangement, the ends of pushrods 186 can disengage upper side rails 34, 36, allowing the door 14 to be moved toward the retracted or open door position or arrangement. In some cases, the exterior latch handle 180 can be a keyed or lockable latch handle and the interior latch handle 182 can be a non-keyed or non-lockable latch handle interiorly adjacent the keyed tailgate 117.

Truck cover 10 can selectively permit access to the truck bed or box 102 in two different manners. Access to the truck bed or box may first be accomplished by raising frame 12 from the closed position, in which the side rails of the frame 12 can be substantially horizontal to the top rail of the truck bed 102, to a raised position, in which the side rails of the frame 12 are angled relative to the top rail of the truck bed. When frame 12 is raised in the open position, a user may then reach into the truck bed through second opening 58 to access items stored therein. The other manner in which a user can access the truck bed 102 via the cover 10 is by closing frame 12 such that it is substantially parallel to the top rail of the truck bed, then moving door 14 from the advanced position to the retracted position. The movement towards the retracted position reveals opening 38, allowing a user to access the contents stored in the truck bed 102 through the revealed opening 38 in communication with inter-rail opening 58.

In some embodiments, the dual action, or dual movements, of truck cover 10 are operatively controlled by latch assembly 20. In one particular embodiment, the lever 86 on latch assembly 20 may be actuated in different directions wherein each directional movement of lever 86 on latch assembly 20 is associated with one of the two movements mentioned above. So, for example, actuation of lever 86 in a first direction may release frame 12 from its locking engagement with base 16 allowing frame 12 to move from the closed position to the open position (e.g., a first action). An actuation of lever 86 in a second direction opposite that of the first direction may be associated with releasing door 14 from its locking engagement so that it may be retracted from the advanced position to the retracted position (e.g., a second action). Stated otherwise, a first action of the latch assembly 20 is associated with movement of the frame relative to truck bed, and a second action of the latch assembly 20 is associated movement of the door relative to the frame.

In another embodiment, the first and second latches 84, 88 may be controlled by separate movements. As provided in FIG. 10, pushrod 112 actuates lever 86 to release 84, while a second action not performed by pushrod 112 moves latch 88. In this embodiment, the release of first latch 84 is associated with moving frame 12 from the closed to the opened position. The release of second latch 88 from its engagement with catch plate 87 is associated with the moving the door from the advanced to the retracted position (See FIG. 11).

Additionally, a lock on the latch assembly 20 may secure the door 14 in the advanced position when the frame 12 is in the open position, and the lock may secure the frame 12 in the closed position when the door 14 is in the retracted position.

In operation and with reference to installation of truck cover 10 onto the truck, and more particularly the truck bed, in some embodiments, longitudinal members 54 and 56 are mounted adjacent the top rails of the truck bed in a fixed manner. In one particular embodiment, coupler 62 couples longitudinal member 54 to the left side of the truck bed and a coupler 62 couples longitudinal member 56 to the right side of the truck bed. Second lateral member 60 may be connected to a front lateral wall of the truck bed 102. During installation, housing 66 can be positioned within the truck bed 102 adjacent the front end of the truck bed 102 extending downwardly from forward end of the cover 10. In some embodiments, the housing 66 can be coupled to and extend downwardly from the front ends of the longitudinal members 54, 56 of the base 16 or otherwise fixed to the truck box 102, so that the housing 66 remains fixedly positioned within the truck box 102 when the frame 12 is pivoted, as seen in FIG. 14, FIG. 20 and FIG. 21.

In operation and with reference to general performance of truck cover 10, in some embodiments, a method for accessing a truck bed can comprise the steps of: actuating a latch assembly 20 on a truck bed cover 10 including a moveable frame 12 carrying a retractable door 14, the frame 12 coupled via a hinge 18 to a base 16 mounted on a truck, a portion of the truck bed cover 10 extending over the truck bed. A first actuating action of the latch assembly 20 is associated with the movement of the frame 12 from a closed position to an opened position. A second actuating action of the latch assembly 20 is associated with moving the door 14 from an advanced position to a retracted position. In this shown embodiment, first latch 84 is released by pushing lever 86 with pushrod 122 and the second latch 88 is release by pulling it away from its engagement with catch plate 87. The user may need to lower tailgate 117 to perform some of the actions described, but there may be some embodiments where these actions can be performed with the tailgate up.

In operation and with reference to FIG. 14 through FIG. 16, hinge assembly 18 may move between a first position (the position shown in FIG. 1) and a second position (the position shown in FIG. 14). The pivot connections of first leg 48 and second leg 50 with flange 46 and flange 64 are laterally extending, allowing portions of frame 12 to rotate thereabout about one or more lateral axes. The first position of hinge assembly 18 is associated with the closed position of frame 12 and the second position of hinge assembly 18 is associated with the open position of frame 12. The J-shaped second leg 50 pivotably couples frame 12 to base 16 permitting entire frame 12 to be vertically above base 16 when frame 12 is in the open position and hinge assembly 18 is in the second position. With entire frame 12 positioned above base 16, there exists a gap between first lateral member 40 and second lateral member 60. It is contemplated that while frame 12 is raised in the open position at a vertical height greater than base 16, the door 14 is in the advanced position preventing anything from moving through aperture 38. Thus, while frame 12 is in the raised position access to the truck bed is accomplished through second opening 58 defined between the rails on the base 16.

With continued reference to FIG. 14 through FIG. 16, during the movement of door 14 between the advanced position and the retracted position, a plurality of laterally extending hinges connecting panels 76 together in a tandem manner allow for the narrow panels to collapse about each other such that they may be wound about spindle 74 having an outer roll 73. A torsion spring 75 may provide the urging force to wind spindle 74. A strap 77 operatively couples roll 73 to forward end of door 14. Spindle 74 may be powered by a motor or can be an idle spindle, as one having ordinary skill in the art would understand. The movement of door 14 between the collapsed position and the advanced position is similar to that of a roll-up door or curtain, selectively permitting access to opening 38 between first member 34 and second member 36. When door 14 is in the contracted position, a substantial portion of door 14 is stored within chamber 72 of housing 66. A control strap 115 may be attached to the rear end of door 14 to allow a user to control the retraction of door 14 about spindle 74.

As depicted in FIG. 17, FIG. 17A, and FIG. 18, in alternative embodiments of the truck cover of the present disclosure generally indicated at 210, a frame 212 includes longitudinally extending rails on each side that are primarily formed from fiberglass, however aluminum may be used as well. A base 216 is mounted to the truck bed and is preferably constructed from aluminum. A laterally extending hinge 218 couples frame 212 to base 216 allowing frame 212 to pivot therearound. Each longitudinally extending member includes an upwardly facing surface 250 composed of portions having different configurations.

As depicted in the cross-section view of FIG. 17A, a first portion 252 of upwardly facing surface 250 is generally planar and connects to an upwardly extending second portion 254 to a slightly plateaued apex portion 256. From the apex portion 256, a third portion 258 extends downwardly, connected to a valley portion 260 defining a runoff channel 262. A fourth portion 264 extends upward from valley portion 260. A ledge 213 rigidly connects to fourth portion 264 and extends inwardly towards the center of the truck bed for a distance of about one, two, or three inches terminating at an inner edge 266. Ledge 213 includes an upwardly facing top surface and a downwardly facing bottom surface and is planarly horizontal in cross-section.

A plurality of panels 215 define door 214. Each panel 215 is a generally planar member formed of fiberglass or other suitably understood polymer or man-made material. Panels may include a raised structural support or rib 270 extending from a front-to-back providing strength to each panel. Structural support ribs 270 may extend side-to-side, as one having ordinary skill in the art would easily understand. Furthermore, ribs 270 may have a general hourglass shape when viewed from above. In this shown embodiment, ribs 270 extend upwardly a short vertical distance to provide structural support as well. Panels 215 are connected in tandem via laterally extending hinges 217.

The manner in which the panels 215 of door 214 may move between the advanced position and the retracted position is via a folding manner along or about laterally extending hinges 217. In this regard, the lateral edges 272 of the door panels 215 are not disposed in channels; rather, the door 214 rests atop ledge 213 on frame 212 and may be releasably secured thereto. One possible releasable securement is via hook-and-loop securing members. Alternatively, edges 272 can rest atop ledge 213 free of any securing member, and, rather be held in place via pressure fit or frictional interference fit. Further alternatively, edges 272 can rest atop ledge 213 and be forcibly held in place as a lock on a latch assembly 220 is locked to secure entire cover 210 in a closed and locked position.

In FIG. 18 the door 214 is depicted in an accordion fold configuration in the open door arrangement. In such an accordion fold configuration, a first panel 215 is adjacent the front or forward end 22, a second panel 215 is hingedly coupled via a hinge 217 to the first panel, and a third panel 215 is hingedly coupled via a hinge 217 in series to the second panel. Thus, the first panel is the forward most panel of the door 214 and the third panel 215 is the rear most panel 215 of this three panel group. Each panel 215 comprises an upper or top surface and a lower or bottom surface and the door 214 is foldable such that the second panel rotates about 180 degrees in a first direction relative to the first panel so that the upper surface of the first panel 215 is positioned to oppose or face the upper surface of the second panel 215 and the third panel 215 rotates about 180 degrees in a second direction relative to the second panel that is opposite the first direction so that the lower surface of the third panel 215 is positioned to oppose or face the lower surface of the second panel 215.

Alternatively, the door 214 can be folded in a spiral fold configuration in the open door arrangement. In such a spiral fold configuration, a first panel 215 is adjacent the rear end 24, a second panel 215 is hingedly coupled via a hinge 217 to the first panel, and a third panel 215 is hingedly coupled via a hinge 217 in series to the second panel. Thus, the first panel is the rear most panel of the door 214 and the third panel 215 is the forward most panel 215 of this three panel group. Each panel 215 comprises an upper or top surface and a lower or bottom surface and the door 214 is foldable from the rear end 24 toward the forward end 22 such that the first panel is pivoted 180 degrees in a first direction from the rear of the first panel and folded so the top surface of the first, rear most panel 215 is positioned to oppose or face toward the adjacent top surface of the second panel 215. The folded first and second panels 215 can be pivoted together 180 degrees in the first direction and folded onto the third panel 215 so the bottom surface of the rear most panel 215 is positioned to oppose or face toward the adjacent top surface of the third, forward most panel 30 of the three panel group.

A handle 221 (located adjacent rear end 24) may selectively actuate latch assembly 220 to initiate either one of a first action (opening frame 212 to a position similar to FIG. 14) or a second action allowing a user to fold the panels about each other via connecting hinges 217. This allows the folded panels to be disposed in a folded and stacked configuration (see FIG. 18) adjacent the front end 22 of the cover 210, and in one particular embodiment the panels are disposed above frame 212 adjacent the front end 22.

Figure 19:
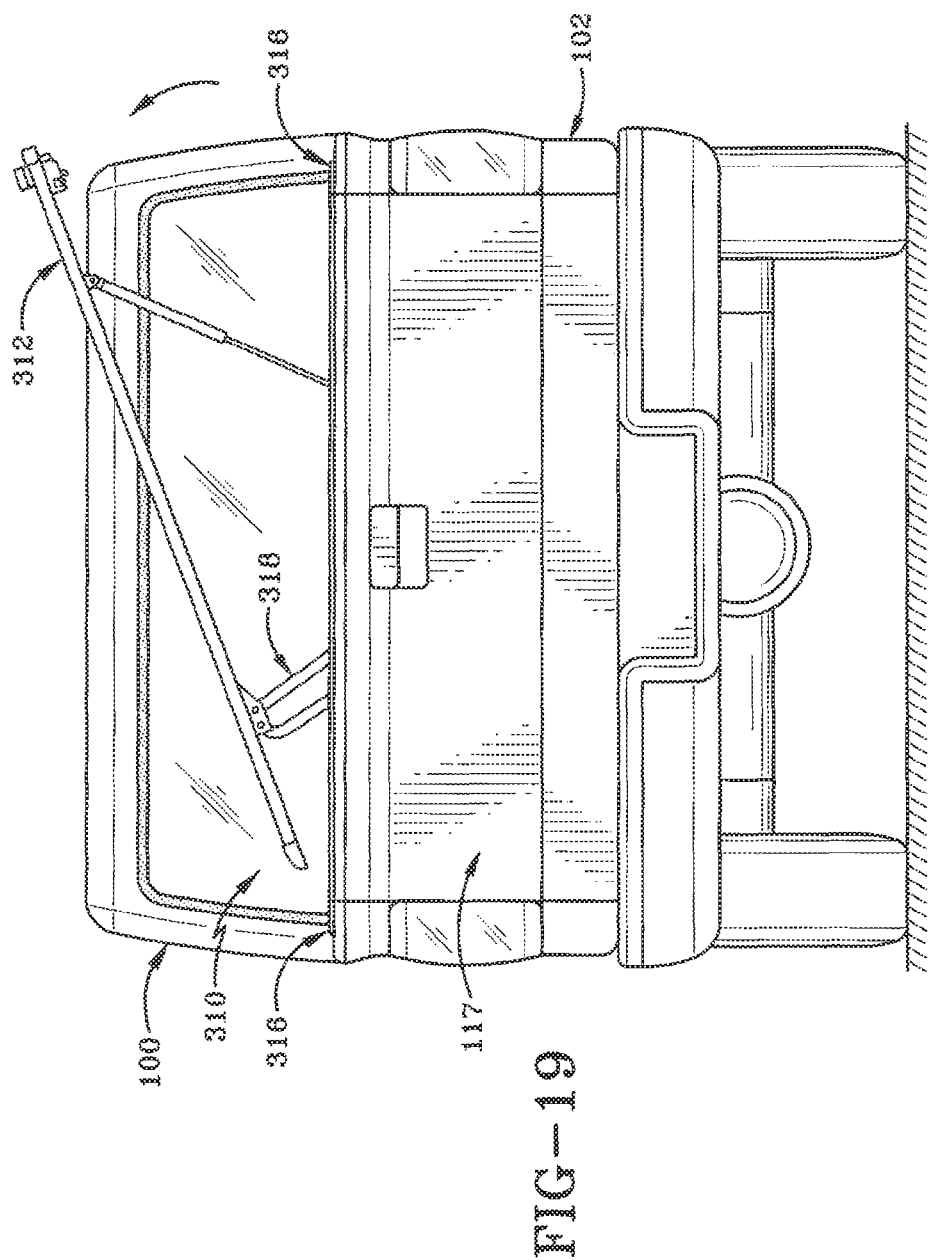
FIG. 19 is an operational rear elevation view of an exemplary embodiment in a second operational mode for opening wherein the first operational mode for opening is similar to the view depicted in FIG. 14.

As depicted in FIG. 19, an alternate embodiment truck cover of the present disclosure may be generally indicated as 310. Truck bed cover 310 may include or comprise a base member 316 mounted on a truck adjacent an upper edge defining an access opening of a truck bed; a frame 312 coupled via a first hinge assembly (the hinge assembly 18 shown in FIG. 1) to the base member 316, the frame substantially horizontal in a first position; a first mode for moving the frame 312 from the first position to access the truck bed; and a second mode for moving the frame 312 from the first position to access the truck bed. The first mode includes pivoting the frame 312 about a laterally extending axis on hinge assembly 18 to raise the frame 312 to an open position (as shown in FIG. 14) and the second mode can include pivoting the frame 312 about a longitudinally extending axis defined by second hinge assembly 318 to raise the frame 312 to an open position (as shown FIG. 18).

In some of the figure views, some elements are not shown for clarity of explanation, however all the figures should be read together as a whole.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred and alternative embodiments of the disclosure are examples and the disclosure is not limited to the exact details shown or described.

What is claimed:

1. A tonneau cover system for a cargo box of a truck, the cargo box having a forward end and opposing first and second sides extending from the forward end, the tonneau cover system comprising:

first and second side rails, each side rail having a forward end and rear end and being pivotally mountable to the cargo box adjacent the first and second sides, respectively, so as to be pivotable about the forward ends between a raised position in which the rear ends of the first and second side rails are raised to provide a rear opening in an open pivot arrangement, and a lowered position in which the rear ends are adjacent the sides in a closed pivot arrangement, the first and second side rails being spaced apart to define an inter-rail area between the first and second side rails;

a door including a plurality of rectangular elements, each of the elements extending between the first and second side rails, the elements being hingedly coupled together and movable between a closed door arrangement wherein the elements cover the inter-rail area and an open door arrangement in which the elements are retracted to permit access through the inter-rail area; and one of:

a dual action handle operably coupled to a latch assembly, wherein a first movement of the dual action handle unlatches the door allowing movement toward the closed door arrangement, and wherein a second movement of the dual action handle unlatches the pair of upper side rails for movement toward the open door arrangement; and an exteriorly accessible pivot handle coupled to a pivot latch assembly, wherein operation of the exteriorly accessible pivot handle selectively unlatches the pair of side rails for movement toward the open pivot arrangement, and an interiorly accessible door handle coupled to a door latch assembly, wherein operation of the interiorly accessible door handle selectively unlatches the door for movement toward the open door arrangement.

2. The tonneau cover system for a cargo box of claim 1, wherein the inter-rail area extends from the rear ends toward the forward ends and wherein the elements are movable in a direction from the rear end to the forward end as the door moves from the closed door arrangement to the open door arrangement.

3. The tonneau cover system for a cargo box of claim 1, wherein the plurality of elements are generally co-planar in the closed door arrangement and wherein the plurality of elements are rolled or folded as the door moves from the closed door arrangement to the open door arrangement.

4. The tonneau cover system for a cargo box of claim 1, wherein the plurality of elements are hingedly coupled along a hinge axis extending substantially perpendicular to the first and second side rails and are mountable to the truck so the hinge axis is substantially perpendicular to a longitudinal axis of the truck, and wherein the elements of the door are retracted from a rear of the truck box toward the forward end of the truck box along the longitudinal axis of the truck.

5. The tonneau cover system of claim 1, wherein the first and second rails are upper side rails, and wherein the tonneau cover system further comprises first and second lower side rails positioned below the first and second upper side rails, respectively, and attachable to the first and second sides of the cargo box, respectively, wherein the rearward ends of the upper side rails are spaced apart from the lower side rails in the open pivot arrangement to provide the rear opening, and further wherein the rear ends are adjacent the lower side rails in the closed pivot position.

6. The tonneau cover system of claim 5, wherein the upper side rails are positioned parallel to each other, and the lower side rails are coupleable to the cargo box to be positioned non-parallel to each other.

7. The tonneau cover system for a cargo box of claim 1, wherein the plurality of elements are generally co-planar in the closed arrangement and wherein the door is a rigid fold-up tonneau cover wherein the plurality of elements are folded together as the door moves from the closed door arrangement to the open door arrangement.

8. The tonneau cover system for a cargo box of claim 1, wherein the plurality of elements are generally co-planar in the closed door arrangement and wherein the door is a rigid roll-up tonneau cover wherein the plurality of elements are rolled together as the door moves from the closed door arrangement to the open door arrangement.

9. The tonneau cover system of claim 1, further comprising a piston-cylinder actuator coupled to each of the side rails to facilitate pivotable movement from the closed pivot arrangement to the open pivot arrangement.

10. The tonneau cover system of claim 9, further comprising link arms pivotably coupled together and to which at least one end of the piston-cylinder actuator is coupled.

11. The tonneau cover system of claim 1, wherein a pivot hinge is coupled between the forward ends of the side rails for pivotably coupling the side rails to the cargo box, the pivot hinge defining a laterally extending, stationary pivot axis and the side rails being pivotable about the stationary pivot axis between the open and closed pivot positions.

12. The tonneau cover system of claim 1, wherein the forward ends of the side rails are coupled together by a forward rail extending laterally therebetween, and wherein a pivot hinge is coupled to the upper forward rail for pivotably coupling the upper forward rail to the cargo box, the pivot hinge defining a laterally extending, stationary pivot axis and the side rails being pivotable about the stationary pivot axis between the open and closed positions.

13. A tonneau cover system for a cargo box of a truck, the cargo box having a forward end and opposing first and second sides extending from the forward end, the tonneau cover system comprising:

first and second side rails, each side rail having a forward end and rear end and being pivotally mountable to the cargo box adjacent the first and second sides, respectively, so as to be pivotable about the forward ends between a raised position in which the rear ends of the first and second side rails are raised to provide a rear opening in an open pivot arrangement, and a lowered position in which the rear ends are adjacent the sides in a closed pivot arrangement, the first and second side rails being spaced apart to define an inter-rail area between the first and second side rails;

a door including a plurality of slats, each of the slats extending between the first and second side rails, the slats being hingedly coupled together and movable between a closed door arrangement wherein the slats cover the inter-rail area and an open door arrangement in which the slats are retracted into a roll configuration adjacent the forward end to permit access through the inter-rail area;

wherein the slats comprise opposite ends within the channels and wheels are coupled to the opposite ends for facilitating movement of the slats between the open and closed door arrangements; and one of:
at least some of the wheels include a circumferential groove and wherein at least one of the side rails includes a protrusion extending into the circumferential grooves; and
at least one of the side rails includes a pair of protrusions engageable against opposite sides of at least some of the wheels.

14. The tonneau cover system of claim 13, wherein each side rail comprises a channel for receiving one of the opposite side edges of the slats, and wherein the slats are slidable within the channel as the door moves between the open and closed door arrangements.

15. A tonneau cover system for a cargo box of a truck, the cargo box having a forward end and opposing first and second sides extending from the forward end, the tonneau cover system comprising:

first and second side rails, each side rail having a forward end and rear end and being pivotally mountable to the cargo box adjacent the first and second sides, respectively, so as to be pivotable about the forward ends between a raised position in which the rear ends of the first and second side rails are raised to provide a rear opening in an open pivot arrangement, and a lowered position in which the rear ends are adjacent the sides in a closed pivot arrangement, the first and second side rails being spaced apart to define an inter-rail area between the first and second side rails;

a door including a plurality of slats, each of the slats extending between the first and second side rails, the slats being hingedly coupled together and movable between a closed door arrangement wherein the slats cover the inter-rail area and an open door arrangement in which the slats are retracted into a roll configuration adjacent the forward end to permit access through the inter-rail area; and a door housing defining a storage chamber for the plurality of slats in the roll configuration; and wherein one of:

a pivot hinge is coupled between the forward ends of the side rails for pivotably coupling the side rails to the cargo box, the pivot hinge defining a laterally extending, stationary pivot axis and the side rails being pivotable about the stationary pivot axis between the open and closed positions, and wherein the pivot hinge is coupled along the door housing and the door housing is coupleable to the cargo box; and the door housing is mountable to the side rails so as to remain fixed relative to the truck box during pivotable movement of the side rails between the open and closed pivot arrangements.

16. The tonneau cover system of claim 15, further comprising a spindle coupled between the door housing and the door, and wherein the plurality of slats in the roll configuration surround the spindle in the open door arrangement.

17. The tonneau cover system of claim 15, further comprising a torsion spring coupled to the door to facilitate movement toward the open door arrangement.

* * * * *